US005615367A

United States Patent [19]
Bennett et al.

[11] Patent Number: 5,615,367
[45] Date of Patent: Mar. 25, 1997

[54] SYSTEM AND METHODS INCLUDING AUTOMATIC LINKING OF TABLES FOR IMPROVED RELATIONAL DATABASE MODELING WITH INTERFACE

[75] Inventors: John G. Bennett, San Mateo; Perry A. Gee; Charles E. Gayraud, both of Santa Cruz, all of Calif.

[73] Assignee: Borland International, Inc., Scotts Valley, Calif.

[21] Appl. No.: 67,202

[22] Filed: May 25, 1993

[51] Int. Cl.$^6$ .................................................. G06F 17/30
[52] U.S. Cl. ........................................... 395/613; 395/326
[58] Field of Search ................................. 395/600, 155, 395/156, 157, 160, 161, 148

[56] References Cited

U.S. PATENT DOCUMENTS

| | | | |
|---|---|---|---|
| 4,791,561 | 12/1988 | Huber .................................. | 395/600 |
| 5,195,178 | 3/1993 | Krieger et al. ...................... | 395/157 |
| 5,301,313 | 4/1994 | Terada et al. ....................... | 395/600 |
| 5,367,619 | 11/1994 | Dipaolo et al. ..................... | 395/149 |
| 5,553,218 | 9/1996 | Li et al. .............................. | 395/148 |

OTHER PUBLICATIONS

Demaria et al, "Working with dBase Mac," 1988, pp. 16–17, 115–118, 408–409.
Microsof Access User's Guide, MicroSoft Corporation, 1992.
Hartzband, David, J. et al., "Enhancing Knowledge Representation in Engineering Database," Computer, Sep. 1985, pp. 39–48.
Burns, L.M. et al., "A Graphical Entity–Relationship Database Browser," System Sciences, 1988 Annual Hawaii Int'l Conference, vol. 2., pp. 694–704.
Siau, K.L. et al., "Visual Database Interface for End User Computing," Computing and Information, 1992 Int'l Conference, pp. 393–396.
Küspert, K., et al., "Design Issues and First Experiences with a Visual Database Editor for the Extended $NF^2$ Data Model," System Sciences, 1990 Annual Hawaii Int'l. Conf., pp. 308–317.
"Borland Paradox for Windows—Guide to Object PAL," 1992 by Borland International Inc., pp. 1–521.
Bachman, C., *Data Structure Diagrams,* Data Base, a quarterly newsletter of SIGBDP, vol. 1, No. 2, Summer 1969, pp. 4–10.

*Primary Examiner*—Paul V. Kulik
*Attorney, Agent, or Firm*—John A. Smart

[57] ABSTRACT

A system includes a relational database management system (RDBMS) having a data modeling component. A "data model" is a graphical representation of the relationship between tables one may use in a design document. "Design documents" allow a user to customize how his or her data are presented, including presenting information in formats which are not tabular and including formats which link together different tables (so that information stored in separate tables appears to the user to come from one place). Methods are described for automatically linking tables to be placed in a data model by comparing unique keys (e.g., primary key or other unique identifier) of one table with indexes (or indexable fields) of another table. Based upon the comparison, the system automatically suggests an appropriate link (if any) for the tables.

35 Claims, 29 Drawing Sheets

FIG. 3C

INFORMATION TABLES 375

CUSTOMER.DB
| CUSTOMER NO | NAME | STREET | CITY | STATE/PROV | ZIP/POSTAL CODE | COUNTRY | PHONE | FIRST CONTACT |

ORDERS.DB
| ORDER NO | CUSTOMER NO | SALE DATE | SHIP DATE | SHIP VIA | TOTAL INVOICE | AMOUNT PAID | BALANCE DUE | TERMS | PAYMENT METHOD | MONTH |

LINEITEM.DB
| ORDER NO | STOCK NO | SELLING PRICE | QTY | TOTAL |

STOCK.DB
| STOCK NO | VENDOR NO | EQUIPMENT CLASS | MODEL | PART NO | DESCRIPTION | CATALOG DESCRIPTION | QTY | LIST PRICE |

VENDORS.DB
| VENDOR NO | VENDOR NAME | STREET | CITY | STATE/PROV | COUNTRY | ZIP/POSTAL | RT | PHONE | FAX | PREFERRED |

POSSIBLE LINKS -------

THIS RELATIONSHIP EXISTS BETWEEN
CUSTOMER NO IN CUSTOMER AND
CUSTOMER NO IN ORDERS. CUSTOMER
NO IN THE PRIMARY INDEX (KEY) OF
CUSTOMER AND A SECONDARY INDEX
IN ORDERS

THIS RELATIONSHIP EXISTS BETWEEN
ORDER NO IN ORDERS AND
ORDER NO IN LINEITEM. ORDER
NO IN THE PRIMARY INDEX (KEY) OF
ORDERS AND A SECONDARY INDEX
IN LINEITEM.

MULTI-VALUE LINK 621

MULTI-VALUE LINK 623

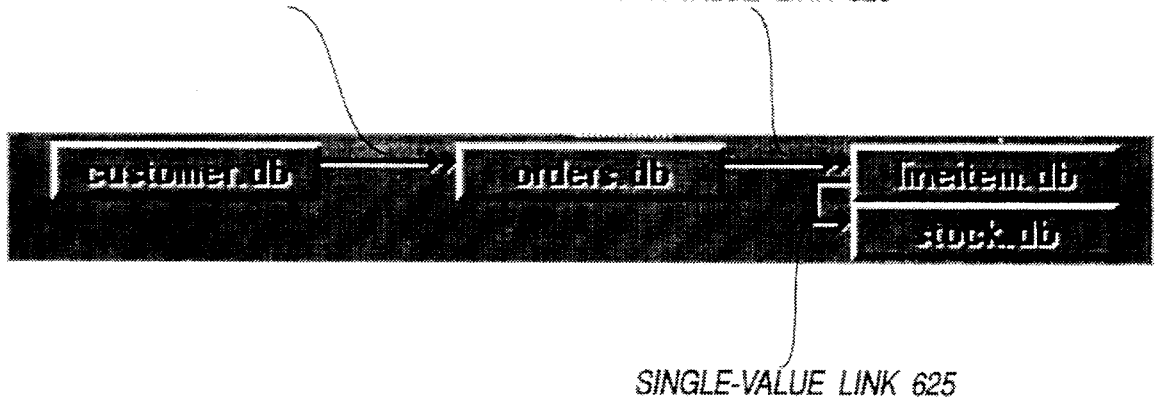

SINGLE-VALUE LINK 625

THIS RELATIONSHIP WAS CREATED BETWEEN
ITEM NO (A SECONDARY INDEX IN LINEITEM)
AND ITEM NO (THE PRIMARY INDEX OF STOCK).

FIG. 6E (1) FOREIGN KEY MATCH
(a) ONE-TO-MANY RELATION:
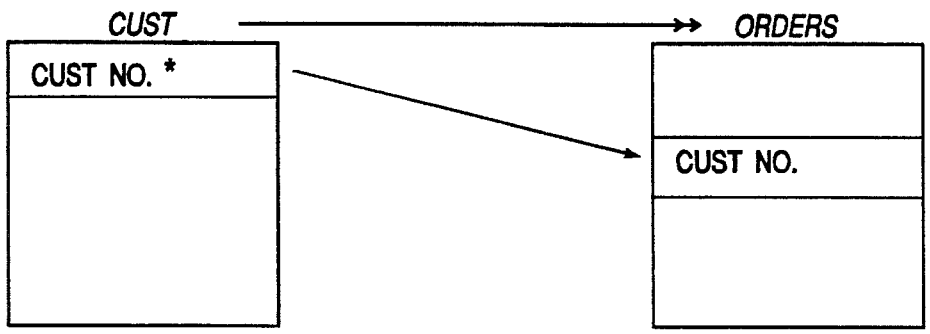
(b) MANY-TO-ONE RELATION:
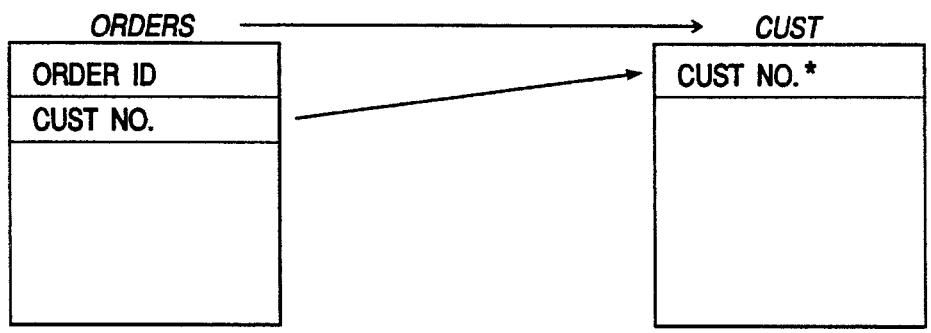
( * = PRIMARY KEY)
FIG. 7A
(2) NO FOREIGN KEY MATCH
(a) TYPE MATCH AGAINST PRIMARY KEY.
(b) AUGMENT TYPE MATCH WITH NAME MATCH.
    (IF POSSIBLE)
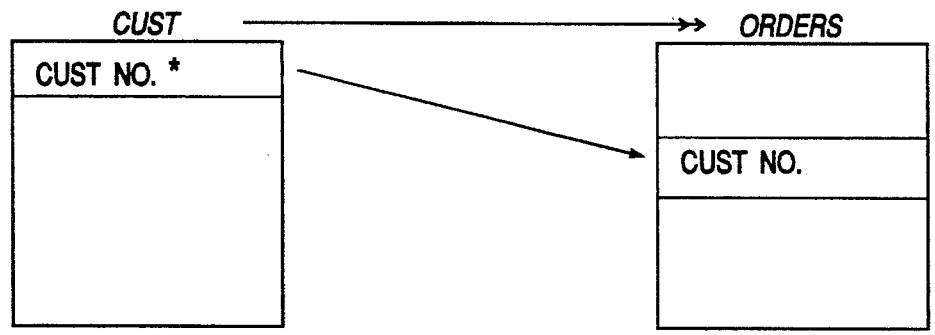
FIG. 7B

SYSTEM AND METHODS INCLUDING AUTOMATIC LINKING OF TABLES FOR IMPROVED RELATIONAL DATABASE MODELING WITH INTERFACE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to modeling information in a data processing system, such as a Database Management System (DBMS).

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand. Of these systems, ones which are of particular interest to the present invention are Relational Database Management Systems (RDBMSs).

The concept of relational databases is perhaps best introduced by reviewing the problems surrounding traditional or non-relational systems. In a traditional database system, the task of retrieving information of interest (i.e., answering a "database query") is left to the user; that is, the user must give detailed instructions to the system on exactly how the desired result is to be obtained.

Consider the example of a simple query: "Who are the teachers of student John Smith?" In a traditional system, several explicit instructions are required before the query can be answered. One instruction, for instance, is typically to instruct the system to allocate sections in memory for data to be read from a storage disk. Another command may tell the system which disk files to open and read into the allocated memory for processing. Still other commands may specify particular search strategies, such as use of specific indexes, for speeding up the result of the query. And still even further commands may be needed for specifying explicit links between two or more files so that their data may be combined. Thus, instead of just telling the system "what" is desired (i.e., the desired data result as expressed in a query expression), one must specify internal procedures (i.e., the "how") for obtaining the data. Even for a simple query, such as that above, the task is complex, tedious, and error-prone.

From the user's perspective, such details—ones directed to the physical implementation—are completely irrelevant; the user is interested only in the result. Thus, the lack of separation of logical operations from the physical representation of the data (i.e., how it is internally stored and accessed by the system) in traditional systems burdens users with unnecessary complexity. Moreover, as traditional database products employ proprietary data access procedures, knowledge of one product is not necessarily helpful in use of another. And where database systems differ, their practitioners cannot effectively communicate with one another.

In 1970, Dr. E. F. Codd invented the "relational model", a prescription for how a DBMS should operate. The relational model provides a foundation for representing and manipulating data, that is, a way of looking at data. The model includes three basic components: structure, integrity, and manipulation. Each will be described in turn.

The first of these, structure, is how data should be presented to users. A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Ideally, data in a relational system is perceived by users as tables and nothing but tables. This precludes the user from seeing explicit connections or links between tables, or having to traverse between tables on the basis of such links. It also precludes user-visible indexes on fields and, in fact, precludes users from seeing anything that smacks of the physical storage implementation. Thus, tables are a logical abstraction of what is physically stored.

The integrity aspect, on the other hand, dictates that every relation (i.e., table) should have a unique, primary key to identify table entries or rows. The integrity of the data for the user is of course crucial. If accuracy and consistency of the data cannot be achieved, then the data may not be relied upon for decision-making purposes.

Data manipulation, the last component, may be thought of as cut-and-paste operators for tables. Data manipulation is of course the purpose for which databases exist in the first place. The superiority of manipulating tables relationally (i.e., as a whole, or sets of rows) is substantial. Users can combine data in various tables logically by matching values in common columns, without having to specify any internal details or the order in which tables are accessed; this provides users with a conceptual view of the database that is removed from the hardware level. Non-relational DBMSs, in contrast, require complex programming skills that form an inherently unreliable means to interact with databases.

The general construction and operation of a database management system is known in the art. See e.g., Date, C., *An Introduction to Database Systems*, Volume I and II, Addison Wesley, 1990; the disclosures of which are hereby incorporated by reference.

Today, relational systems are everywhere—commonly seen operating in corporate, government, academic settings, and other shared environments. A typical installation will employ one of the popular UNIX-based RDBMS running on a minicomputer. By submitting queries to the DBMS from a remote terminal (e.g., using a SQL "query editor"), users are often able to handle many of their own data processing needs directly. Thus, relational technology is not only just another way to build a database system, but it also offers a set of underlying principles that provide very direct practical benefits to the user.

The strong theoretical underpinnings of relational systems which account for their superior design have also created some unexpected problems. With the ever-increasing trend towards "down-sizing," more and more data processing tasks are being moved off mainframes and minicomputers and onto desktop PCs, often operating in a Local Area Network (LAN). Although relational systems are easier for end users to use (e.g., for querying), they are by no means easier to set up or maintain. With the movement of data processing chores to desktop PCs, ordinary PC users are nevertheless often faced with the responsibility of designing and implementing a database system, one having the reliability and integrity associated with a relational system.

Consider the following issues attendant to setting up a relational database management system (RDBMS). Tables in a relational system are not just any tables but are, instead, special "disciplined" tables. Relational systems require, for instance, that tables not store duplicates (so that each row may be uniquely identified by one or more column values). Thus, relations or "R-tables" are subject to particular constraints (e.g., "first normal form"). As another example, to preserve simplicity and take advantage of relational operations, database tables should not contain "repeating groups"—that is, multi-valued columns. Such multi-valued columns remove table resemblance to relations and thus prevent tables from taking advantage of the latter's mathematical properties. Instead, relational tables should contain only single-value cells or "atomic" data values. Thus, while relational tables are simple and flexible in theory, they nevertheless entail rigorous constraints which must be obeyed to implement them in practice.

While trained database administrators have the expertise to tackle such issues, ordinary PC users for the most part have received no formal data processing education. They cannot be expected to be familiar with such seemingly esoteric concepts as "joins" "one-to-many relation" "foreign keys", or any of the other myriad of issues which must be considered when applying the relational approach to database management.

Prior approaches to this problem for PC systems have been restricted to reciting a curt overview of the relational model, typically with two or three pages of a user's manual attempting to provide a "quick and dirty" description of first and second normal forms (and occasionally third normal form). Little or no guidance is given to the user in understanding how one goes about modeling his or her data in a relational system. Instead, the user is left to fend for himself or herself.

What is needed is system and methods whereby ordinary end users, particularly those with no data processing experience or training, may apply the relational approach to a database management problem in a simple, intuitive fashion. In particular, such a system should provide tools for automating the task of data modeling in a relational database system. The present invention fulfills this and other needs.

SUMMARY OF THE INVENTION

A system of the present invention includes a relational database management system (RDBMS), where information is maintained in one or more database tables for easy, efficient storage and retrieval. In addition to database tables, the system provides "design documents" which allow a user to customize how his or her data are presented, including formats which are not tabular. Design documents can also link together different tables, so that information stored in separate tables appears to the user to come from one place.

The system of the present invention provides a data modeling component or module for simplifying the creation of design documents. A "data model" is a graphical representation of the relationship between tables one may use in a design document. The model provides the user with a simple, intuitive way of telling the system which tables are desired to be displayed in a design document and how such tables work together.

The data modeling module includes tools to assist the user in achieving a desired model. In general operation, the user specifies two tables to link (e.g., with a pointing device). In response, the system of the present invention intelligently determines a link (relationship) which is desired between the tables. First, the system automatically attempts to create a link using a unique key (i.e., primary key, candidate key, or other unique index) of the master table. If a foreign key relationship exists between the two tables (e.g., defined previously through referential integrity), then the system automatically selects the foreign key relationship to display to the user as a suggested link.

In the event that no foreign key relationship exists, the system determines if one may be implied. Specifically, the system searches for an index (or indexable field) of the detail table which is data-type compatible with that of the primary (unique) key field of the master. If none exists, then no link will be suggested. If one is found, however, the system will then proceed to find the best name match available (from the one or more data-type compatible indexes).

Upon selecting an index, the system may suggest a link as follows. If the index of the detail table is a unique index, then a one-to-one link is inferred. If, on the other hand, the index of the detail table is non-unique, then a one-to-many link is implied. In the instance that no such index has been selected (or can be built from one or more indexable fields), then the system does not suggest a link to the user. At this point, however, the user may manually select a desired field(s) to link on, whereupon the system automatically attempts to locate a corresponding field which satisfies the selected field(s).

After determining the best possible link (if any), the user is provided with a screen dialog whereby the link may be accepted or rejected. Tools are also provided which allow the user to manually construct a link as desired. In this manner, the data modeling module of the present invention allows a user to efficiently and quickly create a desired data model, thereby simplifying the task of designing documents for presenting one's information in a desired format.

BRIEF DESCRIPTION OF THE DRAWINGS

FIGS. 3C–E are bitmap screenshots illustrating use of the Desktop's client area for displaying and manipulating major objects of the system, including table objects, form objects, report objects, and the like.

FIG. 3F is a block diagram of a sample database system for tracking sales orders.

FIGS. 3G–K are bitmap screenshots illustrating the structuring of information tables for the system of FIG. 3F.

FIGS. 6A–E are bitmap screenshots illustrating the Data Model component being employed for modeling a complex data model, one having multiple relationships between many tables.

FIGS. 7A–B are block diagrams illustrating the automatic determination of a link between tables.

Figure 1A:
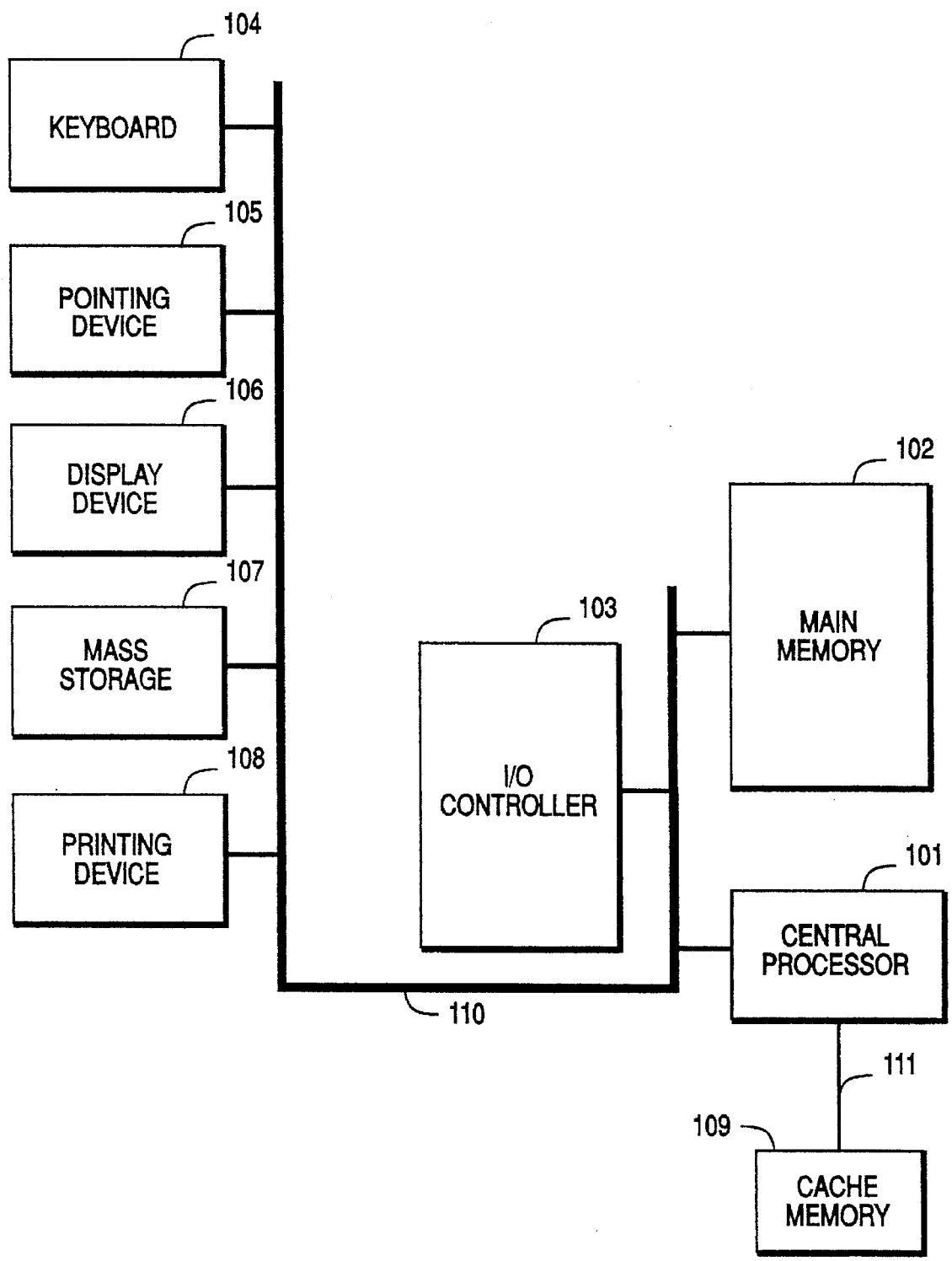
FIG. 1A is a block diagram of a computer system in which the present invention may be embodied.

GLOSSARY alias: The name a user assigns to a directory path.

alternate keys: Candidate keys (see below) which are not selected as the primary key for a table.

alphanumeric field: A field containing letters, numbers, or a combination of both.

ASCII: American Standard Code for Information Interchange; a sequence of 128 standard characters.

binary field: A field used to store data the system cannot interpret (without additional instructions). A common use of a binary field is to store sound.

bind: To associate a form or report with one or more tables. The document then takes its data from the table(s) to which it is bound.

blank field: A field that does not contain a value.

candidate keys: Keys comprising all sets of column combinations with unique values for a table. One of these is selected as the primary key; the rest remain alternate keys.

cascade: To use referential integrity to update child tables when a value changes in the parent table.

command: a word on a menu or button that one chooses to perform an action.

composite key: A key comprised of two or more fields of a table which, together, provide a unique value for each record of the table.

data: The information stored in a table.

data integrity: The assurance that the values in a table are protected from corruption.

data type: The kind of data a field can contain. Data types include alphanumeric, number, currency, date, short number, memo, formatted memo, binary, graphic, and OLE.

database: An organized collection of information.

Database Management System (DBMS): System that controls the organization, storage, and retrieval of information in a database.

default: What the system automatically does or looks like in the absence of an overriding command.

default action: The choice that the system determines to be the most logical or safest and the one that will be carried out unless otherwise specified. Default actions are performed by double-clicking on an object or its icon.

define: to attach a design object to data from a table. For example, one would define a field object in a form as a field in a table.

design document: A form or report that one creates or modifies in a design window.

design object: An object one can place in forms and reports. One creates design objects using toolbar tools in a design window.

design window: The window where one creates or modifies the design of a document. If one is viewing data in a Form or Report window, he or she can select the Design button to open the corresponding design window for that document.

Desktop: The main window in system. The Desktop is the highest level of interaction with all system objects.

detail table: In multi-table relationships, the table whose records are subordinate to those of the master table.

dialog box: A box that requests or provides information. Many dialog boxes present options to choose among before one can perform an action. Other dialog boxes display warnings or error messages.

domain: A set of permissible values (i.e., pool of values) for one or more (shared) columns that have the same meaning.

drop-down list box: A single-line text box that opens to display more choices when one clicks a downward pointing arrow.

field: A column of information in a table. A collection of related fields makes up one record.

field type: The type of data a field can contain. Field types include alphanumeric, number, currency, date, short number, memo, formatted memo, binary, graphic, and OLE.

field value: The data contained in one field of a record. If no data is present, the field is considered blank.

file: A collection of information stored under one name on a disk. For example, the system tables are stored in files.

form: An alternate presentation or view of a table's data. A multi-table form can display data from several tables at once.

group: (1) In a report or query, a set of records that either have the same value in one or more fields; fall within a range of values; or are displayed in a fixed number of records; and (2) to collectively identify various objects as a single entity.

index: A file that determines an order in which the system can access the records in a table. A system table's key establishes its primary index.

inspect: To view or change an object's properties. To inspect an object, one would either right-click it or select it with the keyboard and press F6. The object's menu appears. One selects from the menu the property he or she wants to change.

key: A field or group of fields in a system table used to order records or ensure referential integrity. Establishing a key has three effects: (1) The table is prevented from containing duplicate records; (2) The records are maintained in sorted order based on the key fields; and (3) A primary index is created for the table.

link: To establish a relationship between tables by linking corresponding fields.

logical value: A value (True or False) assigned to an expression when it is evaluated.

lookup table: A table that assures that a value entered in one table matches an existing value in another table.

Main menu: The menu bar across the top of the system Desktop.

master table: In a multi-table relationship, the primary table of a user's data model. If one has only one table in his or her data model, that table is the master table.

multi-record: Refers to an object that displays several records at once in a form or report.

normalized data structure: An arrangement of data in tables in which each record includes the fewest number of fields necessary to establish unique categories. Rather than using a few redundant fields to provide all possible information within a single table, normalized tables distribute information over many tables using fewer fields. Normalized tables provide more flexibility in terms of analysis.

object: A table, form, report, query, script, or library. All entities that can be manipulated in the system are objects.

OLE: OLE stands for Microsoft Windows' Object Linking and Embedding. One can use OLE to insert files from OLE servers into system tables or OLE objects.

primary index: An index on the key fields of a system's table. A primary index (1) Determines the location of records; (2) Lets one use the table as the detail in a link; (3) Keeps records in sorted order; and (4) Speeds up operations.

prompt: Instructions displayed on the screen. Prompts ask for information or guide a user through an operation.

properties: The attributes of an object. One must right-click an object to view or change its properties.

query: A question one asks the system about information in his or her tables. The query can be a simple question about the information in a single table or a complex question about information in several tables.

record: A horizontal row in a system table that contains a group of related fields of data.

record number: A unique number that identifies each record in a system table.

referential integrity: A way of ensuring that the ties between like data in separate tables is maintained.

report: Information from tables printed on paper or previewed onscreen.

secondary index: An index used for linking, querying, and changing the view order of tables.

set: A specific group of records (e.g., about which a user intends to ask questions).

structure: The arrangement of fields in a table.

table: A structure made up of rows (records) and columns (fields) that contains information.

toolbar: The set of buttons and tools for frequently performed tasks. The toolbar is displayed under the menu bar and changes according to the window one is using.

unique index: An index capable of uniquely identifying each record for which a value is given in a table.

validity check: A constraint on the values one can enter in a field.

DETAILED DESCRIPTION OF A PREFERRED EMBODIMENT

The following description will focus on the presently preferred embodiment of the present invention, which is operative in the Microsoft® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
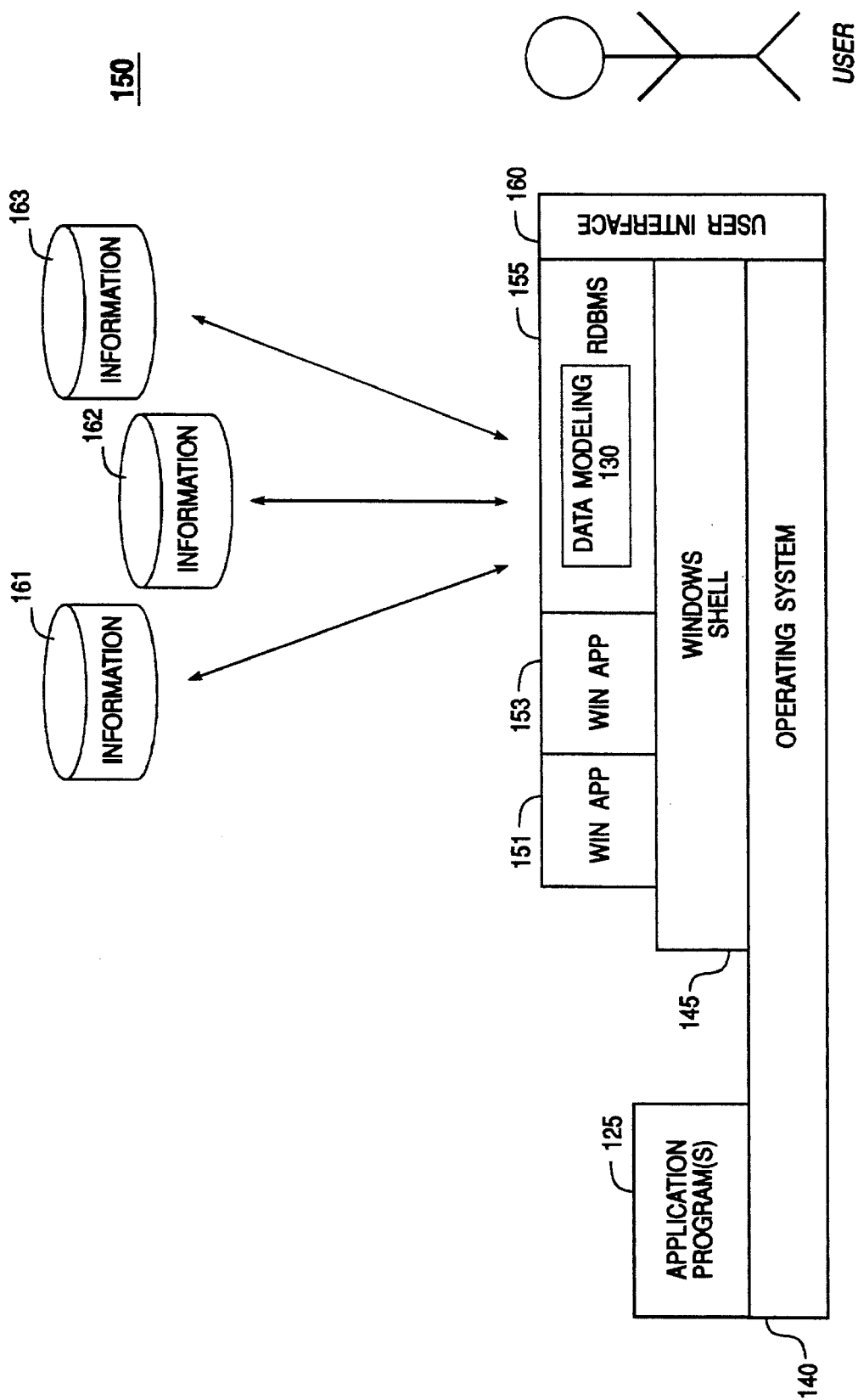
FIG. 1B is a block diagram of a software system of the present invention, which includes operating system, application software, relational database management system, and user interface components.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140. In a preferred embodiment, OS 140 is MS-DOS and windows 145 is Microsoft® Windows; both are available from Microsoft Corporation of Redmond, Wash. RDBMS 155 includes Paradox® for Windows Database Management System, available from Borland International of Scotts Valley, Calif.

The system 150 also includes a Data Modeling module 130 of the present invention for aiding users in the task of creating and managing specific data models in a relational system. As shown, the module 130 is typically embodied within RDBMS 155. Before undertaking a detailed description of the construction and operation of the Data Modeling module 130 itself, however, it is helpful to first examine the general construction of RDBMS 155 and the preferred interface employed in its operation.

B. Relational Database Management System

RDBMS 155 is a system that controls the organization, storage, and retrieval of information from a database. A database is an organized collection of related information or data stored for easy, efficient use. An address book is a database, as is the card catalog in a library, a company's general ledger, and a completed tax form. Thus, a database is a collection of one or more tables used to keep track of information, such as the information 161, 162, 163 of system 150.

1. Tables

In a relational database management system, information is represented in tables. As conceptually shown in FIG. 1C, a table 170 is organized (logically) into horizontal rows (tuples) 173 and vertical columns 175, thus making it easy for a user to examine or change data. Each row or "record" contains all available information about a particular item, such as storing information about an individual person, place, or thing (depending on what the table tracks). A record for an employee, for instance, may include information about the employee's ID Number, Last Name and First Initial, Position, Date Hired, Social Security Number, and Salary. Thus, a typical record includes several categories of information, that is, each record in the table is made up of several categories of information about one specific thing.

Although a database record includes information which is most conveniently represented as a single unit, the record itself includes one or more columns or categories of information. A vertical column contains one category of the data or "field" that makes up a record. Each field contains one category of information about the person, place, or thing described in the record. In the employee table, categories include ID Number, Last Name and First Initial, Position, Date Hired, Social Security Number, Salary, and so on.

Each field has a field type specifying what sort of information the field can hold and what actions can be performed with that field's data. The system categorizes fields into several types. Each field's type determines the kind of data it contains. Some common field types include alphanumeric (or character), number, date, currency, and memo. System tables also support binary large objects fields, which hold specialized information, such as formatted memos, graphic images, and OLE links.

Internally, tables may be stored by the system as a sequence of fixed-length or variable-length binary records in a single disk file. The system uses a record number as an internal counter to keep track of each record. Between the actual physical database itself (i.e., the data actually stored on a storage device) and the users of the system, therefore, a database management system or DBMS provides a software cushion or layer. Because the DBMS shields the database user from knowing or even caring about underlying hardware-level details, the system manages record numbers automatically, with precautions taken so a user cannot change them directly. Thus, all requests from users for access to the data, including requests to retrieve, add, or remove information from files, are processed by the RDBMS without the user's knowledge of underlying system implementation.

2. Keys

As previously described, every relation (i.e., table) requires a unique, primary key to identify table entries or rows. Thus, a primary key (or just "key") is a field containing data that uniquely identifies each record of a table. In addition to creating a key on just a single field (e.g., key on Last Name), a user may create a "composite key" for a group of fields (e.g., key on Last Name+First Name). Whether a simple or composite key is employed, a key requires a unique value for each record (row) of a table to ensure that a table does not have duplicate records.

Often for a given table, it is possible another set of fields in a table could have been employed as the primary key. All column combinations with unique values form a pool of "candidate keys," from which one is selected as the primary key. The rest remain alternate keys. In SQL and some other databases, candidate keys are generally recognizable because a "unique" index is likely to have been declared upon them. They can (at least in theory) be declared without necessarily having an index. Also, a unique index does not necessarily imply a candidate key; the fields could be only occasionally used and, hence, not valuable as identifiers for the entire table.

A table that has a key defined is said to be a "keyed" table. A table's key establishes the default sort order for the table. The system sorts the table's records based on the values in the field(s) the user defines as the table's key. This makes it easy for the system to find and process records quickly and to preserve the discipline required for a relational table (by not allowing records with duplicate values in the key). In a preferred embodiment, keyed tables are supported internally through use of indexes, which will now be described.

3. Indexes (a) General

By employing one or more database indexes, the records of a table can be organized in many different ways, depending on a particular user's needs. When a user requests an index, the system creates a file that contains the indexed field's values and their corresponding locations. The system refers to the index file when locating and displaying the records in a table. One can use an index to view the records in a different order from the default order. However, the records remain stored in the same physical location as they were entered.

Figure 1C:
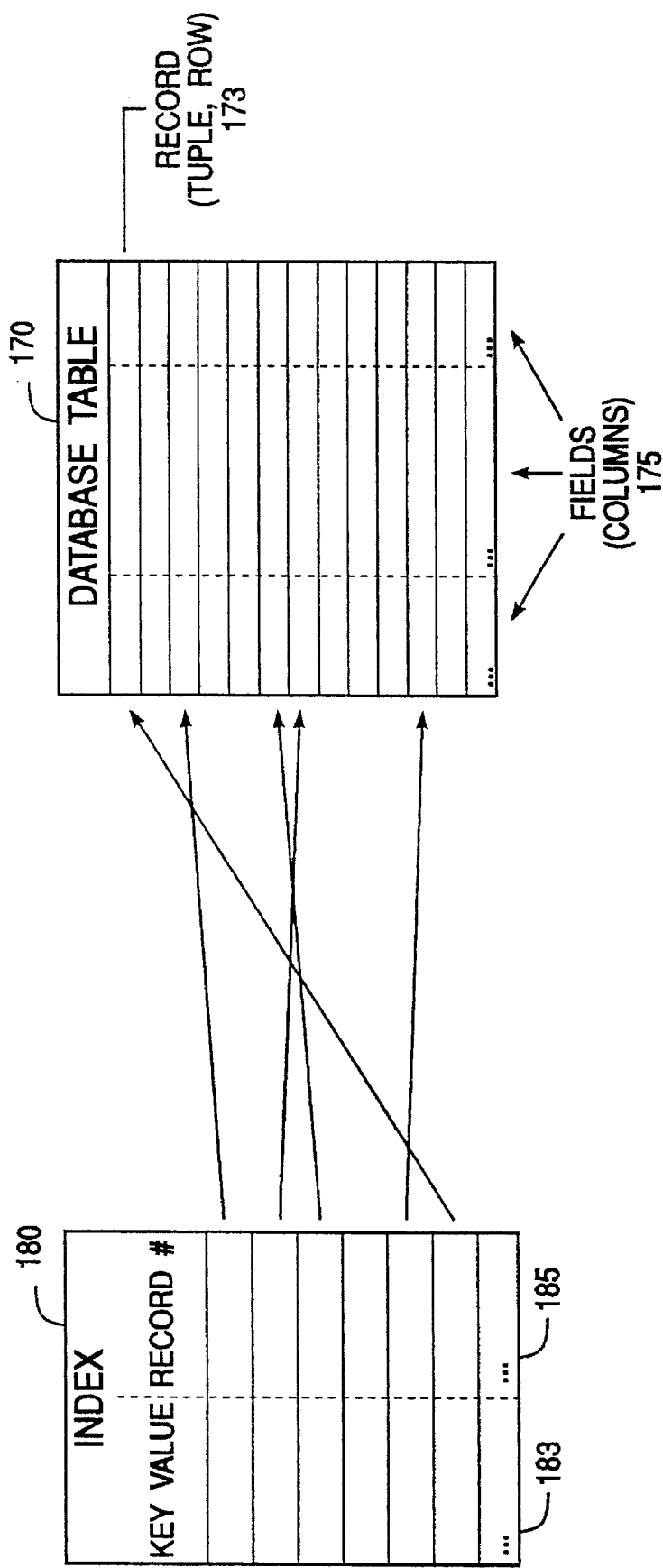
FIG. 1C is a diagram illustrating the conceptual relation between a database table and its index.

As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searching (querying) for and sorting of information.

(b) Primary Index (key)

The system organizes the records of a keyed table according to the values in the field(s) of the table's key. This is its primary index. By default, all indexes organize and access data in ascending order (A to Z or 0 to 9); a different order may be specified by the user if desired. By requesting an index based on a Last Name field of a table, for instance, the user is instructing the system to organize the table by the values in the Last Name field, that is, an alphabetic sort by last name. If, on the other hand, the user prefers to organize the table by first names, he or she can make First Name the primary index, whereupon the system displays the records according to the value in that field. For a composite key, the system organizes the records by the first field of the key (according to the table's structure), then the next field, and so on.

(c) Secondary Indexes

In addition to specifying a primary index or key for a table, the system of the present invention permits the user to specify one or more "secondary indexes" to define alternate view orders for the table. For example, if the user sometimes wants to view a table by First Name values, but needs to keep the table's key order (e.g., Last Name) intact, he or she can create a secondary index on First Name and use it to temporarily change the view order of the records. When the user views a table using a secondary index, the physical location of the records in the table does not change. Secondary indexes can also be used in linking database tables (as described below).

In a preferred embodiment, secondary indexes can be either automatically maintained or non-maintained. (Primary indexes are always maintained.) When the index is maintained, the system updates the index file whenever the user updates the table. A non-maintained index is not automatically updated when the user updates the table, but the user can open a non-maintained index for use on a table. As in the case of composite primary index, the user can create a secondary index on a group of fields, that is, a composite secondary index. In this manner, the secondary index organizes the data by the first field of the index first, then by the second, and so forth.

4. Referential integrity

If data is to be relied upon for decision-making purposes, data integrity should be assured. Of particular interest to the present invention is referential integrity, which assures that a field or group of fields in one table (called the "child" or "detail" table) matches the values in the key of another table (called the "parent" or "master" table). The value found in the child table that matches the key of the parent table is called the foreign key.

Referential integrity provides the user with a way of handling changing values in the parent table that affect the foreign keys in all its child tables. Suppose, for instance, that the user has an Orders table with a Customer No field. The user wants to be very sure the value he or she enters in that field represents a customer who can be found (and billed) in his or her Customer table. To ensure this, Customer No in Orders is defined as a foreign key pointing to Customer. Then, each time the user enters a value in the Customer No field of Orders, the system checks the Customer No field of Customer to make sure the entry is valid.

The system also provides for cascading updates. Suppose the user needs to change a value in a parent table's key. Referential integrity gives the user a way to make the same change in all matching foreign key records of the child table. Using the example of Customer and Orders, suppose the user changes the Customer No value of a record in Customer. Unless one uses referential integrity, all records in the child table (Orders) that belonged to the parent record become orphaned—they are no longer associated with a valid record in Customer. Using referential integrity, the system can cascade the change from Customer to Orders, The system finds all records in Orders that match the changed value in Customer's key and changes them to the new value.

C. Graphical User (Windowing) Interface

1. System UI

Figure 2:
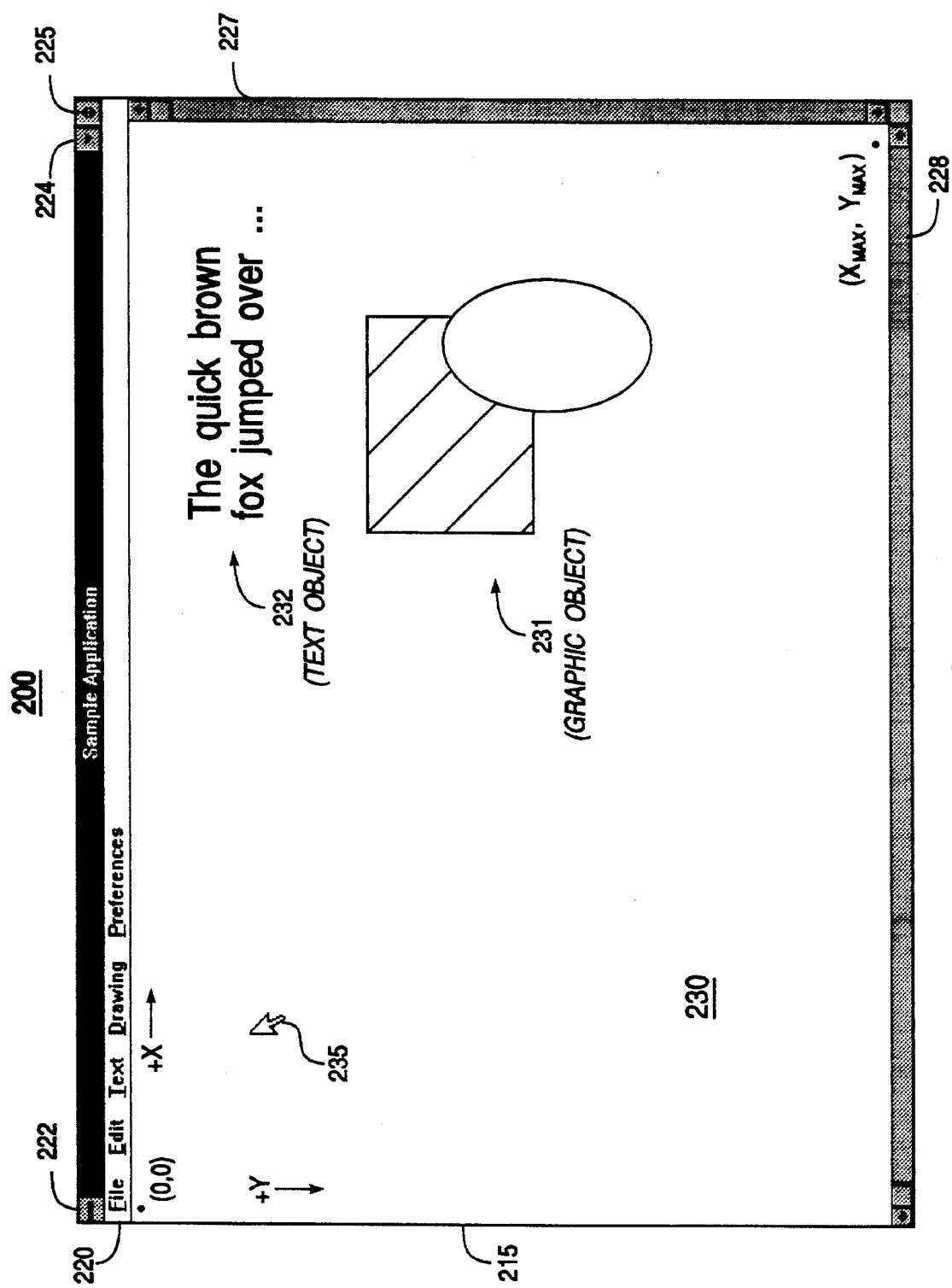
FIG. 2 is a bitmap screenshot illustrating the basic architecture and functionality of a graphical user interface in which the present invention may be embodied.

As shown in FIG. 2, the system 100 typically presents User Interface (UI) 160 as a windowing interface or workspace 200. Window 200 is a rectangular, graphical user interface (GUI) for display on screen 106; additional windowing elements may be displayed in various sizes and formats (e.g., tiled or cascaded), as desired. At the top of window 200 is a menu bar 220 with a plurality of user-command choices, each of which may invoke additional submenus and software tools for use with application objects. Window 200 includes a client area 230 for displaying and manipulating screen objects, such as graphic object 231 and text object 232. In essence, the client area is a workspace or viewport for the user to interact with data objects which reside within the computer system 100.

Windowing interface 200 includes a screen cursor or pointer 235 for selecting and otherwise invoking screen objects of interest. In response to user movement signals from the pointing device 105, the cursor 235 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 200 may be closed, resized, or scrolled by "clicking on" (selecting) screen components 222, 224/5, and 227/8, respectively. Keystroke equivalents, including keyboard accelerators or "hot keys", are provided for performing these and other user operations through keyboard 104.

In a preferred embodiment, GUI 200 is embodied in a message-based windowing environment. The general methodology for creating windowing interfaces and for retrieving and dispatching messages in an event-based GUI system, such as Microsoft Windows, is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference*, Vols. 1 and 2, and 3) *Tools*, all available from Microsoft Corp. of Redmond, Wash. The disclosures of each of the foregoing are hereby incorporated by reference.

2. Desktop UI

Figure 3A:
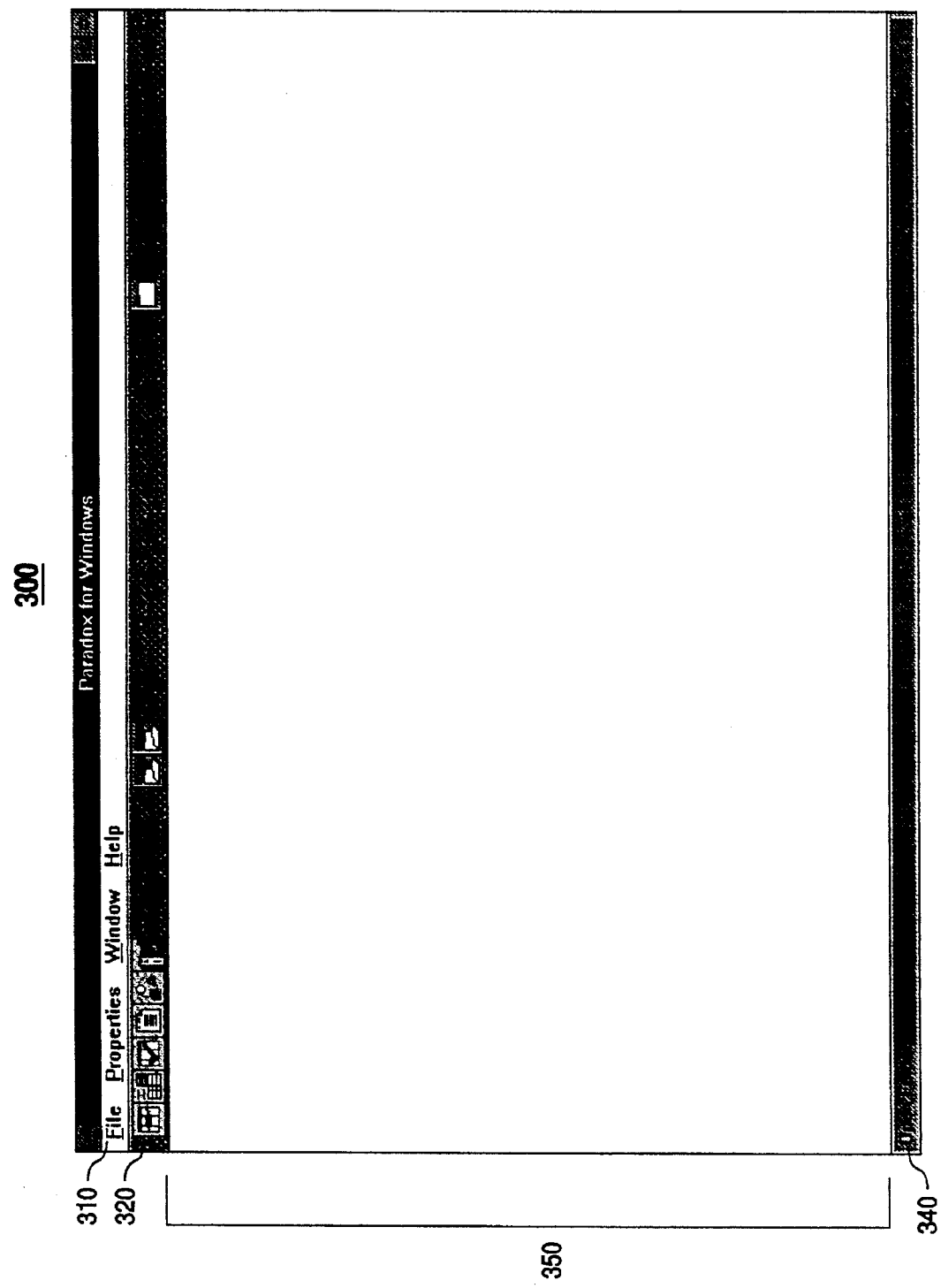
FIG. 3A is a bitmap screenshot illustrating a preferred Desktop or application interface for the system of the present invention.

In addition to the general windowing interface 200 for system 100, a preferred application interface is provided for RDBMS 155. When one starts the RDBMS system, a Desktop interface 300 first appears in display 106, as shown in FIG. 3A. The Desktop is the central working area in the system and serves as a "parent" window to all windows that appear in the system. It is where the user initiates all tasks. All windows are opened on the Desktop and are contained by the Desktop. Using the Desktop, the user can create and modify objects, set preferences, open and close files, and the like.

The Desktop may be divided into functional regions which include a main menu 310, a toolbar 320, a client area 350, and a status line 340. The menu bar 310 contains commands the user can choose to open windows, configure his or her Desktop, and work with his or her data. The menu bar is context sensitive, that is, it contains only the menus one needs at the moment. If a menu is not appropriate for a given task, it does not appear on the menu bar.

Figure 3B:
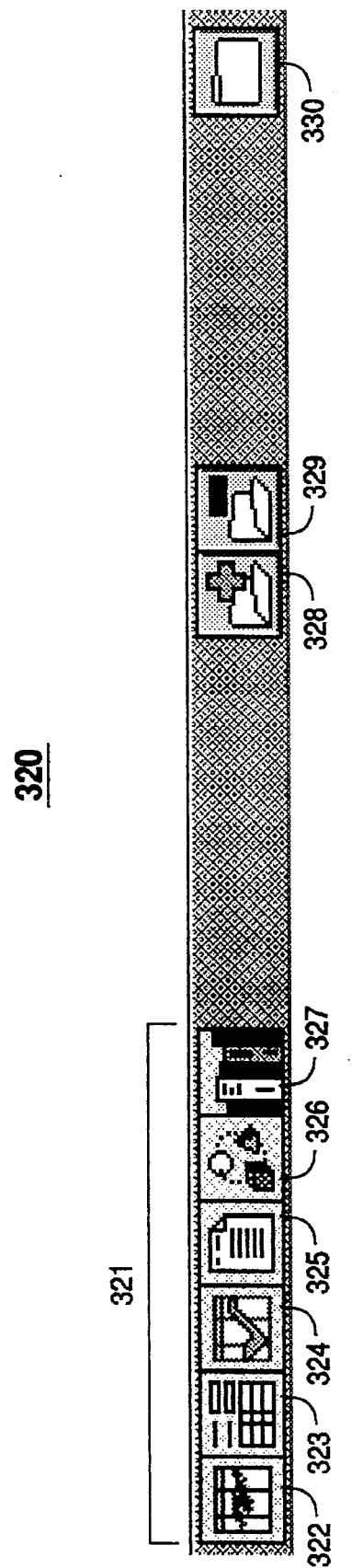
FIG. 3B is an enlarged view of a toolbar from the interface of FIG. 3A.

The toolbar 320 contains shortcut buttons for common menu commands. The toolbar 320, shown in further detail in FIG. 3B, comprises a row or palette of tools which provide a quick way for the user to choose commonly-used menu commands or properties. Like the menu bar, the toolbar buttons change as different windows are opened. To choose a toolbar button, one selects (clicks) it with the mouse. In an exemplary embodiment, the Desktop toolbar 320 includes Open Table 322, Open Form 323, Open Query 324, Open Script 325, open Report 326, Open Library 327, Add Folder Item 328, Remove Folder Item 329, and Open Folder 330 tools. The same actions are also available as corresponding commands in menus (available from menu bar 210).

The status bar 340 gives a user information about the task he or she is working on and the current state of the system. Like the menu bar and the toolbar, the appearance of the status bar changes as one works. As with the interface 200, standard Windows controls, like the title bar, the borders, the Control menu, the Maximize button, and the Minimize button are provided to let a user control the shape, size, and position of the Desktop.

Desktop 300 includes a client area 350, which functions in a fashion similar to that for the above-described Windows interface 200 (in FIG. 1C) for displaying and manipulating screen objects of interest. In addition to simple text and graphic objects, the system provides the user with a set of sophisticated objects for storing and presenting his or her data. These will now be described in turn.

3. System Objects (a) Tables and Design Documents

Figure 3C:
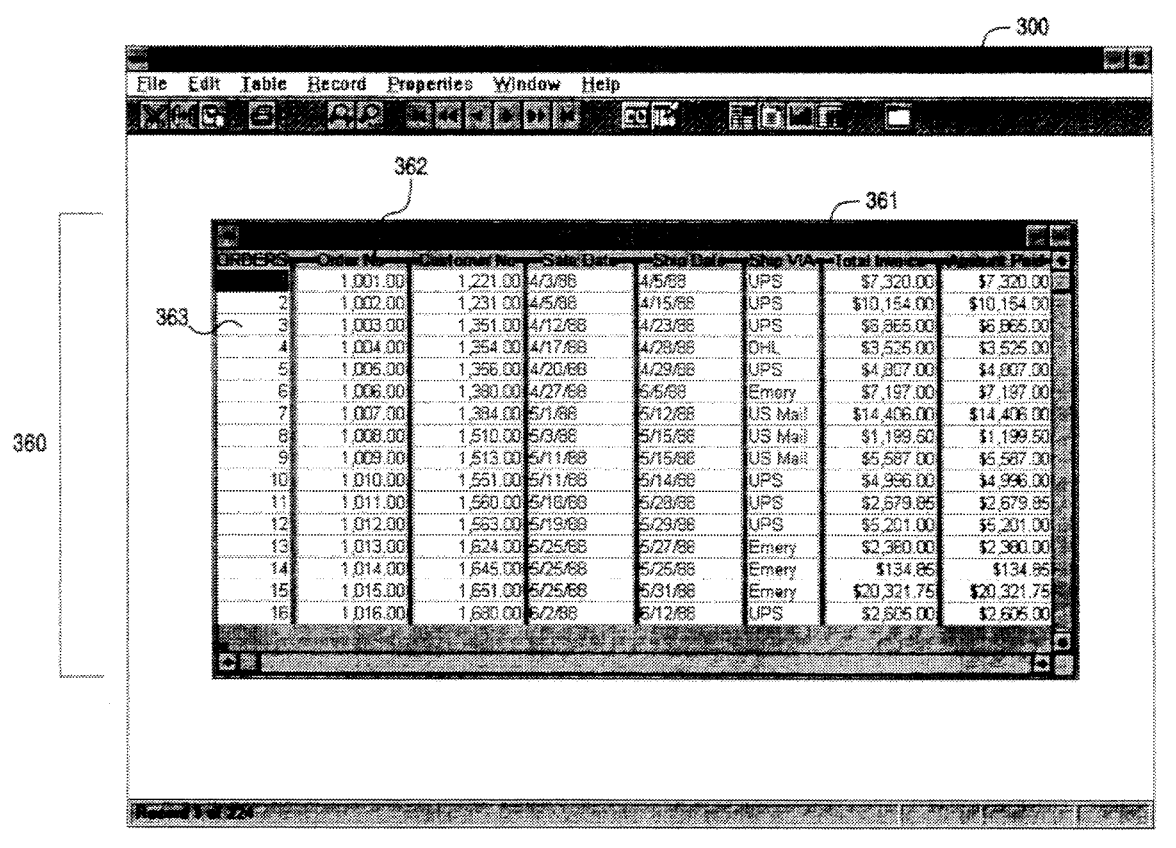
Figure 3D:
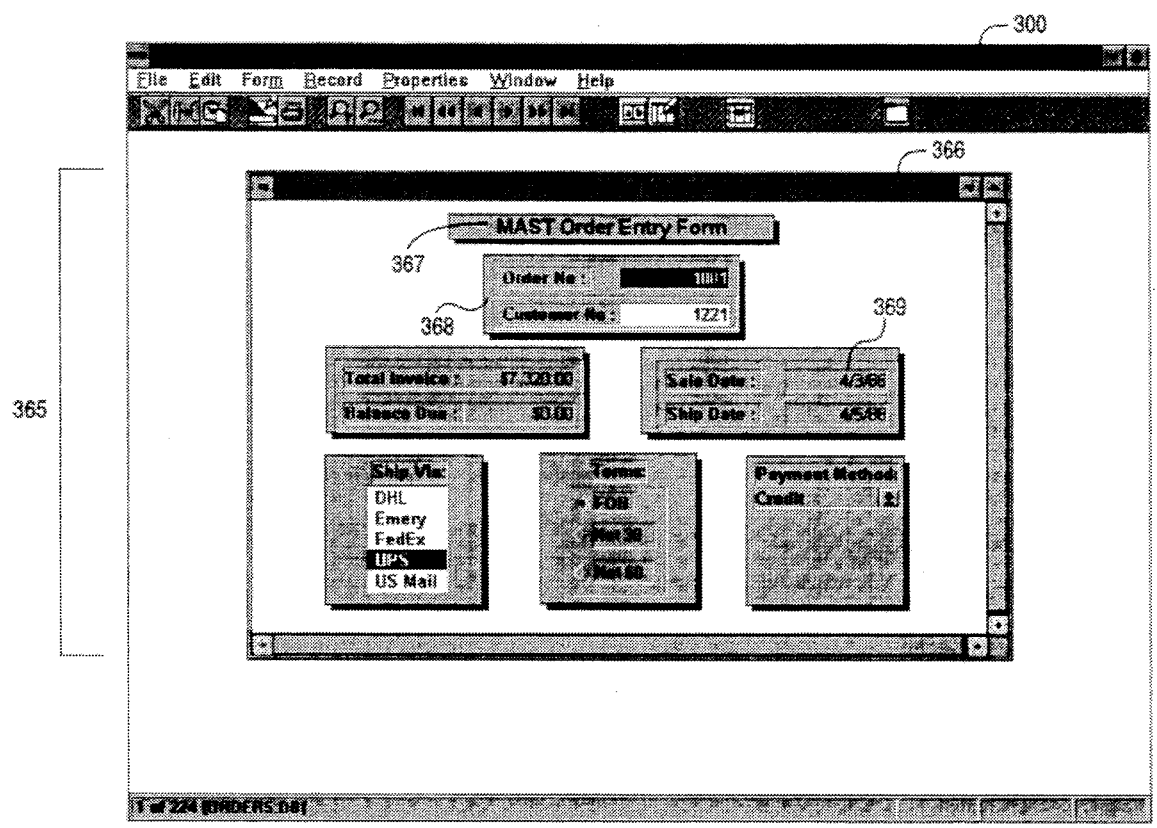
Figure 3E:
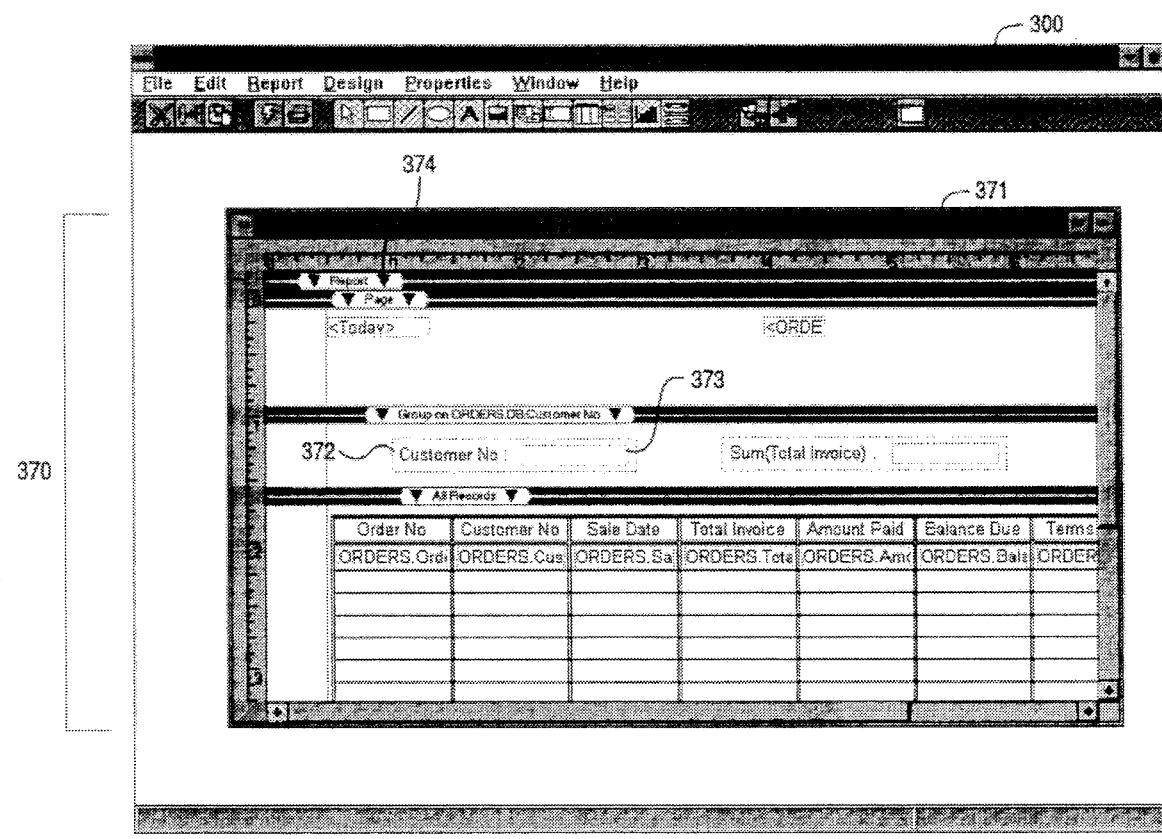

The system provides a set of objects including table, form, report, query, script, and library objects. As shown in FIGS. 3C–E, each type of major object in the system appears in its own type of window within the client area 350 and is itself comprised of objects. Table 361, for example, appears in a Table window 360; it comprises row and column objects 362, 363. Form 366 appears in a Form window 365 and includes (among other objects) an edit field object 369, a box object 368, and a text object 367. Similarly, Report 371 appears in a Report window 370 and includes, for instance, a report band object 374, a field object 372, and an edit field 373 (contained within the object 372). Each type of window includes specialized commands and functions that apply only to that type.

The Desktop 300 contains all windows; here, the commands and functions of the Desktop remain available to all the objects. Once one learns to work with one type of object, he or she can work with similar objects. For example, when the user knows how to edit tables using Table windows, he or she can also edit tables using Form windows. When one knows how to design forms, he or she has the basics of designing reports.

While tables (e.g., Table 361) are the objects that users will use the most in the system, users will often want to display information in a format which is not tabular. For this purpose, the system provides "design document" objects. Form 366 and Report 371 are design documents for instance. Each allows the user to customize how the user's data are presented.

The system of the present invention provides forms and reports as design documents that can present a user's data in a variety of formats. For instance, a user can create design documents that display one record at a time, display multiple records at a time, display only certain fields of a table, display design features (e.g., lines, boxes, graphic images, shading, or special color), and the like. Design documents can also link together different tables, so that information stored in separate tables appears to the user to come from one place.

Forms and reports differ as follows. Forms are editing tools which let the user display and edit data in his or her tables. The user can, for example, create forms that add data to several tables at once. Reports, on the other hand, are printing tools. They allow the user to format and print his or her data. A user can, for example, use reports to create form letters, mailing labels, invoices, and the like. Unlike forms, reports cannot change the data in a user's table (though they can change the way his or her data appears on a final report).

To create a new design document, the user proceeds as follows. First, the user opens a design window for the type of document desired. For a form object, for instance, the user would open a form window (e.g., Form Window 362). Next, the user places the objects he or she needs on the document. Finally, the user changes the property of the objects on the document until they appear as desired.

Underlying the design document is one or more tables that contains the data which the user wishes displayed on screen or printed in a report. Thus, the task of creating a design document is one of choosing the table (or tables) that contains the data desired; defining the relationships between tables (in the instance of a multi-table design document), specifying the fields desired to be displayed in the design; and choosing an initial design layout for the document. This task is greatly simplified by use of the data modeling module 130 of the system of the present invention, which will now be described.

(b) Creating tables

The creation of information tables and design documents will be illustrated for a small sales order-management database, which is sophisticated enough to demonstrate the elements of creating a relational model, but is sufficiently simple for clarity. The database includes a plurality of information tables 375 as shown in FIG. 3F. It includes a Customer table (CUSTOMER.DB) for storing customer data, and includes an Orders table (ORDERS.DB) for storing information about each order made by a customer. As shown, each of these two tables includes a common field: Customer No. The two tables may, therefore, be linked through this common field. Moreover, to maintain integrity of the Orders table, no order should be accepted for a customer which does not exist; in other words, the Orders table is preferably dependant on the Customer table (in a child-to-parent or detail-to-master relation).

Just as the Orders table may depend from the Customer table, the Orders table itself may have several tables depend from it. Thus, as shown in FIG. 3F, the database also includes a Line Item table (Line Item.DB), a Stock table (STOCK.DB), and a Vendors table (VENDORS.DB). The Line Item table serves to store each line of information of each order; thus, each entry in the Line Item table references the Orders table through a common field, the Order No. Each entry in the Line Item table includes a Stock No, thus referencing an entry in the Stock table. Each entry in the Stock table includes a Vendor No, for referencing a particular entry in the Vendors table.

Figure 3G:
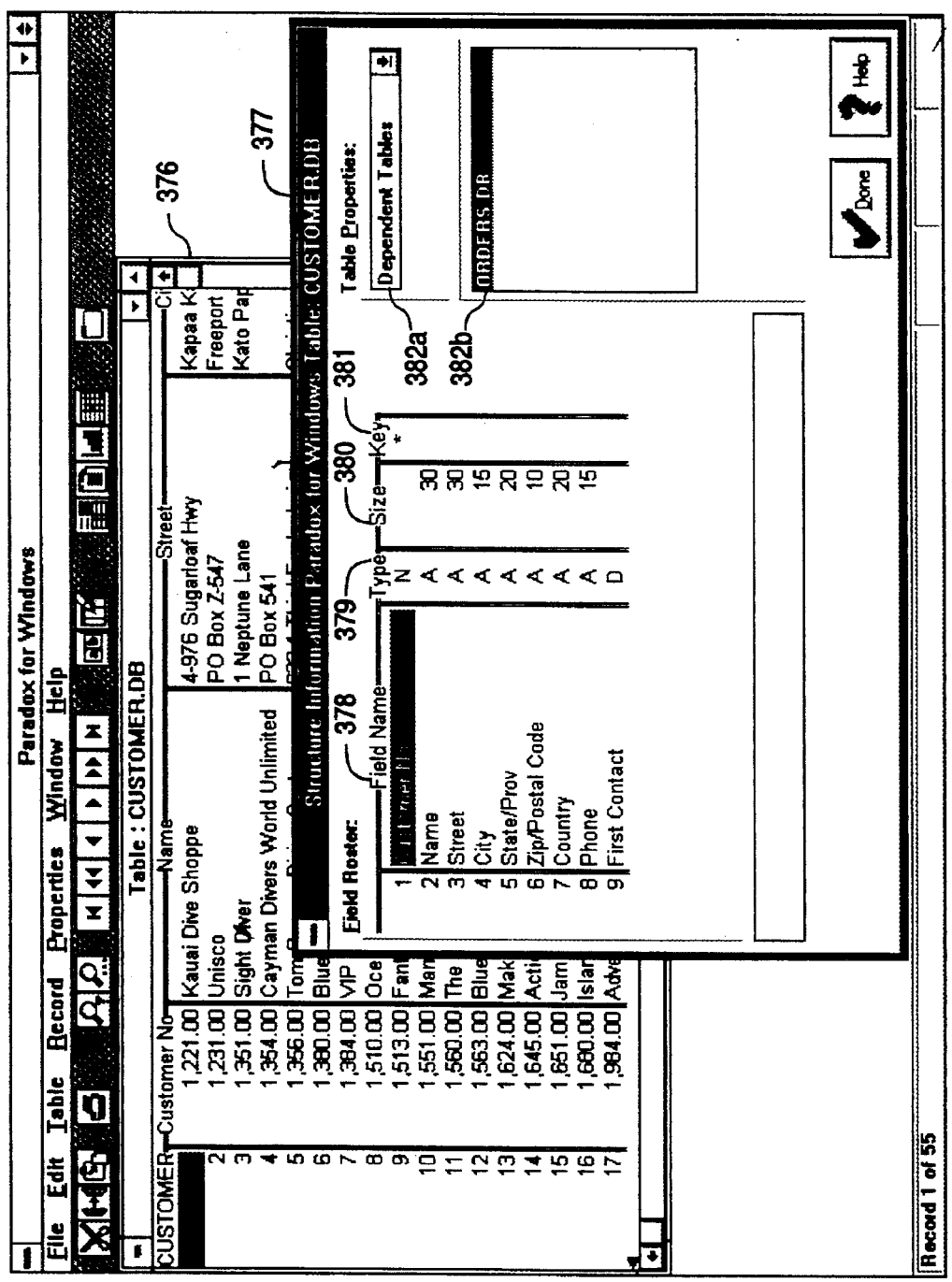

To create these tables, the user specifies a structure for each. The structure includes information about the name of each field, its type, and its size (if necessary). As shown for the Customer table 376 of FIG. 3G, for instance, the table has been defined with a structure as shown by the structure information dialog 377. Each field has been given a field name 378, a type 379, and a size 380 (if necessary). In addition, the user may select one or more fields to serve as a key 381 (or no fields in the instance of an unkeyed table). Also shown, the dialog 377 includes a table properties list 382a. With the property list set to show dependent tables, a display list 382b indicates that the Orders table is dependent upon the Customer table (as will be described in further detail).

Figure 3H:
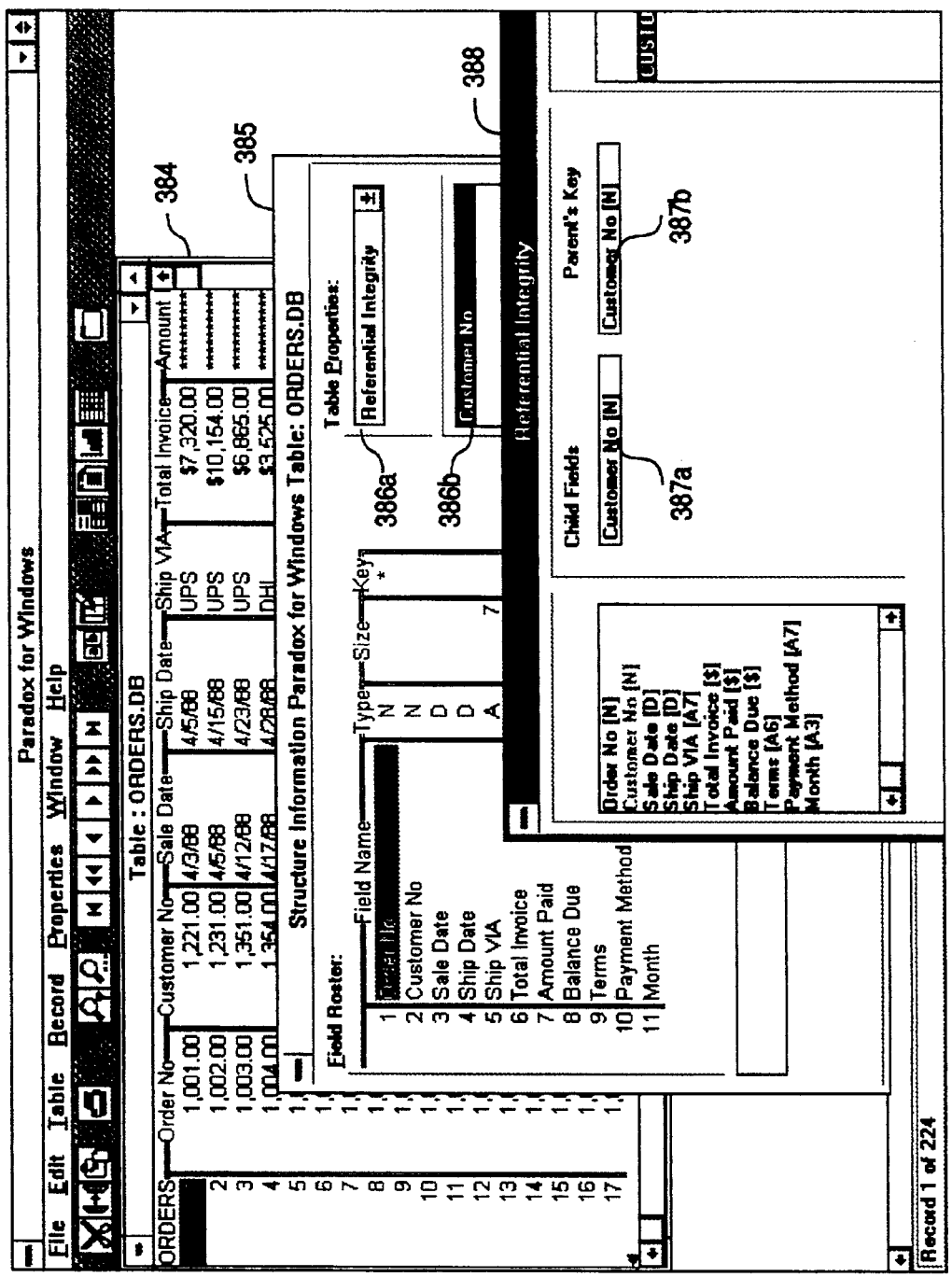
Figure 31:
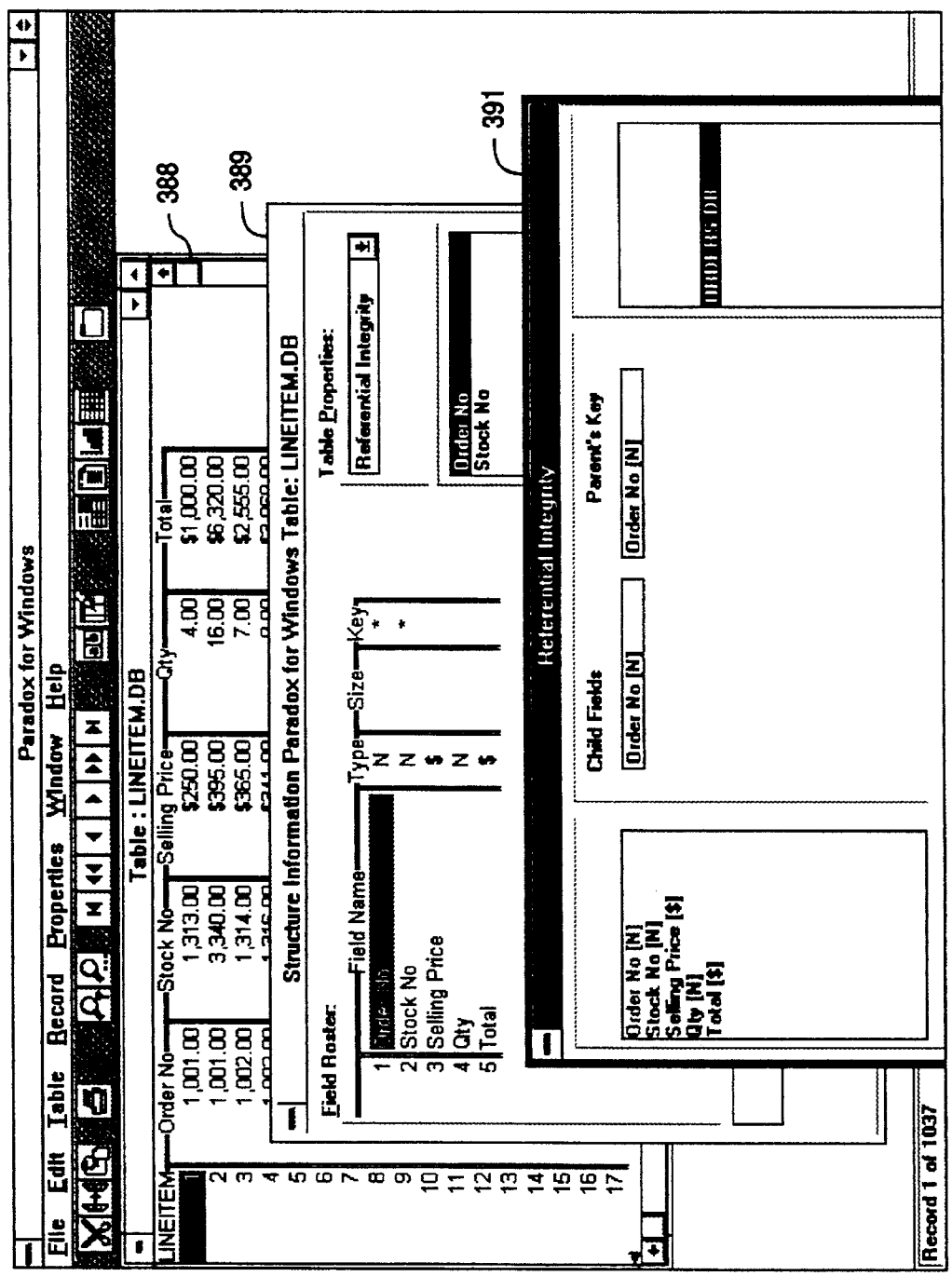

The structure for the Orders table 384 is shown in structure information dialog 385 of FIG. 3H. As before, appropriate information has been entered for field name, type, and size. Also shown, the table has been keyed by Order No. From the table properties list 386a, the user has specified a referential integrity check for the Customer No field (which now appears also in the list 386b). In response to the request, the system displays a referential integrity dialog 388. As shown by the child fields list 387a, the user has selected the Customer No field from the Orders table 384 to match a parent's key of Customer No (shown in a parent's key list 387b), thus linking the Orders table 384 to the Customer table 376.

Figure 3J:
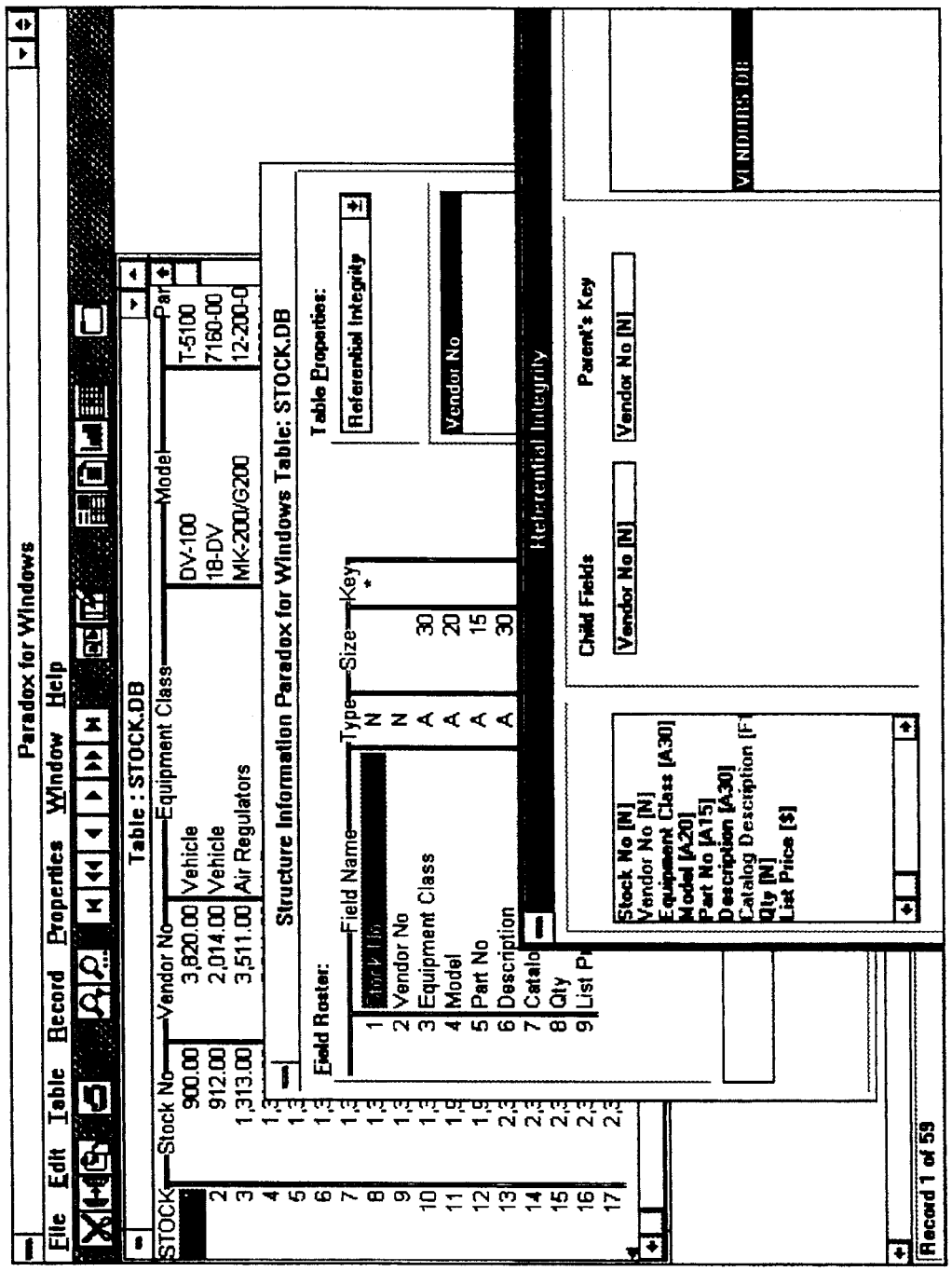
Figure 3K:
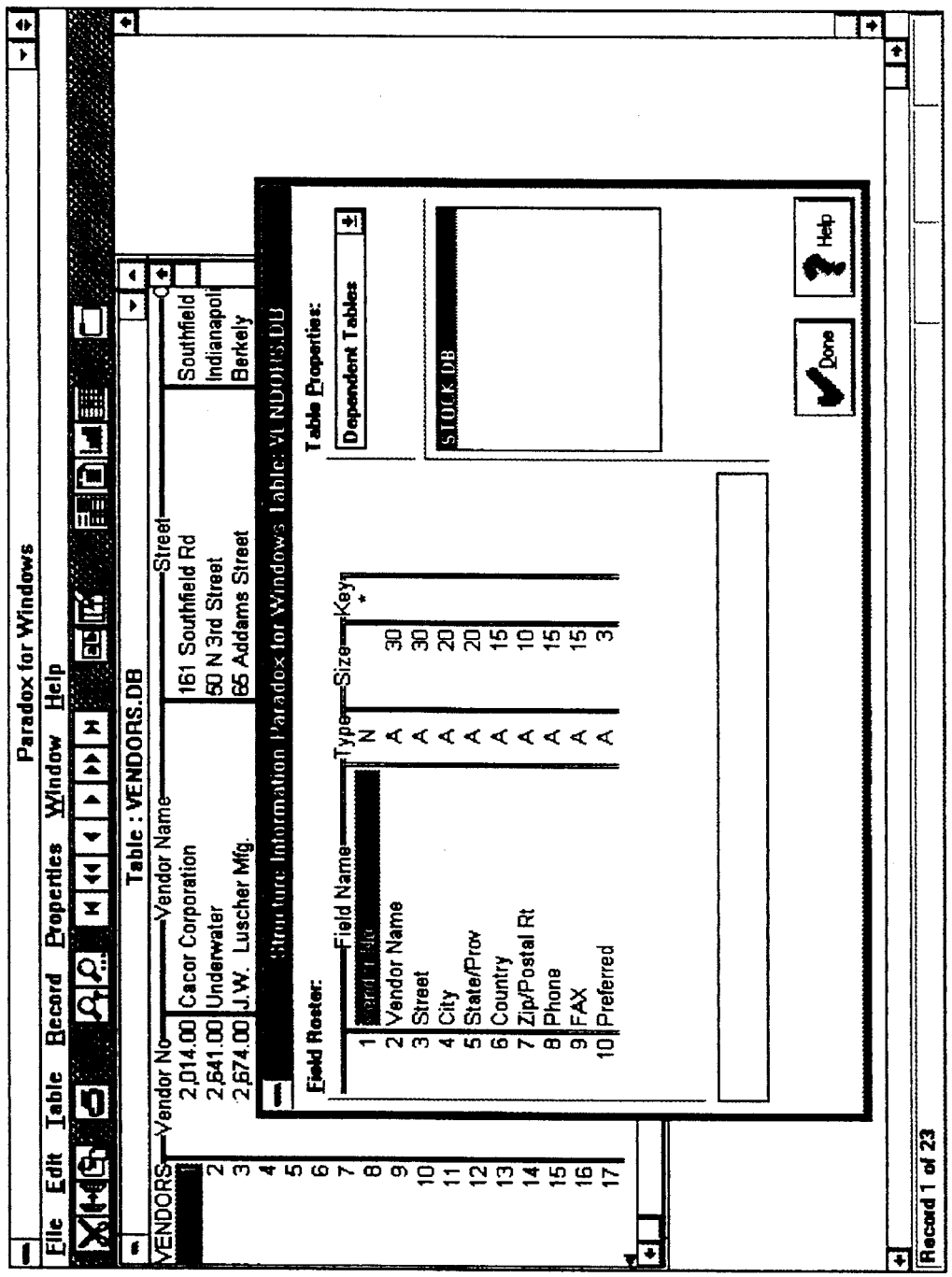

As shown in 3I–K, Line Item, Stock, and Vendors tables are structured in a like manner. Line Item table 388 includes a structure as shown in dialog 389, with referential integrity checks defined on its Order No and Stock No fields (e.g., the Order No field is linked to the Orders table as shown in the referential integrity dialog 391). Structures for the Stock and Vendors tables are shown in FIGS. 3J and 3K, respectively.

Visual Data Modeling

A. General

According to the present invention, a "data model" is a graphical representation of the relationships between tables one may use in a design document. It provides the user with a simple, intuitive way of telling the system which tables he or she wants to display and work with in the design document being created, and how these tables work together.

Figure 4A:
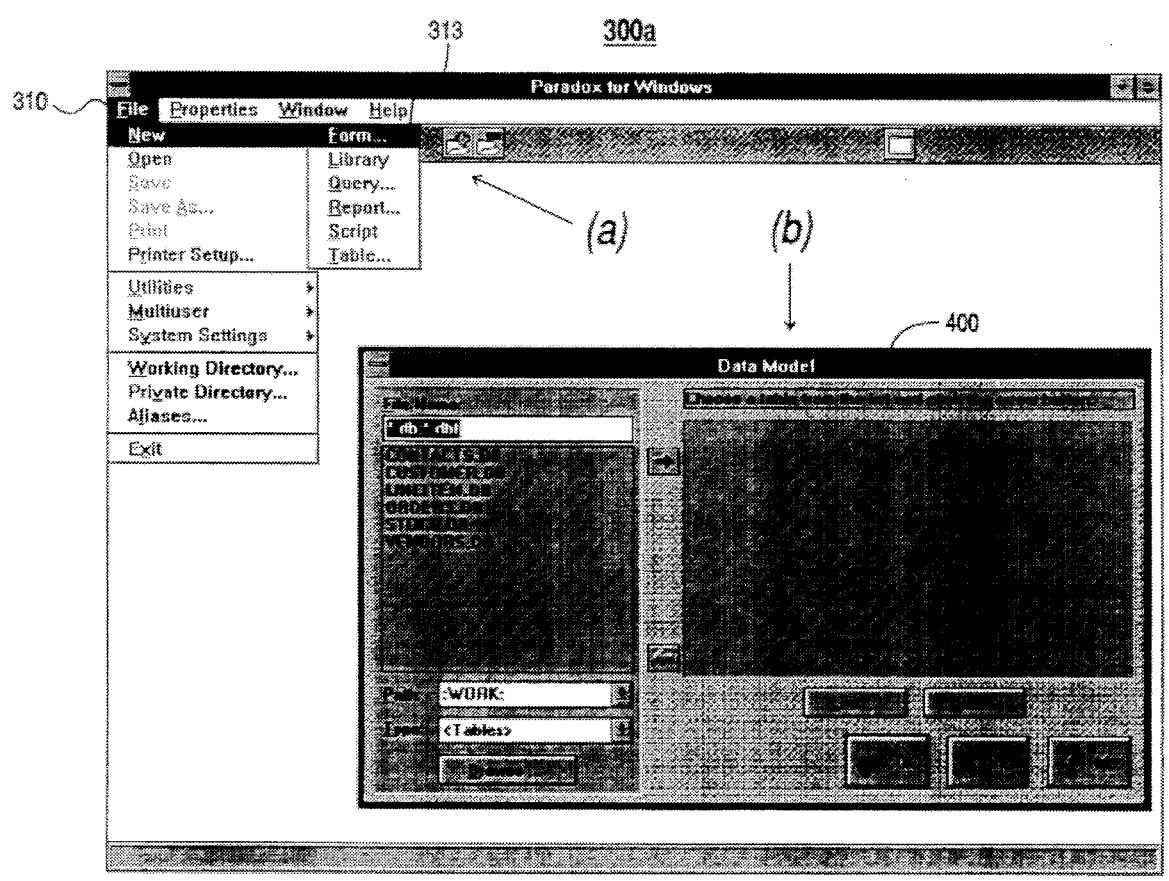
FIGS. 4A–F are bitmap screenshots introducing a Data Model component of the present invention.

Referring now to FIGS. 4A–F, creation of a new design document using the data modeling module 130 of the present invention will now be described for creation of a form design document. As shown in FIG. 4A, the user begins the process by instructing the system to create a new form document (e.g., by selecting the form command 313 from the main menu 310). In this manner, the user has instructed the system that a new form design document is desired. In response, the system displays a data model dialog box 400, as shown. Whether the user desires a form or report design document, he or she starts with the data model dialog box.

Figure 4B:
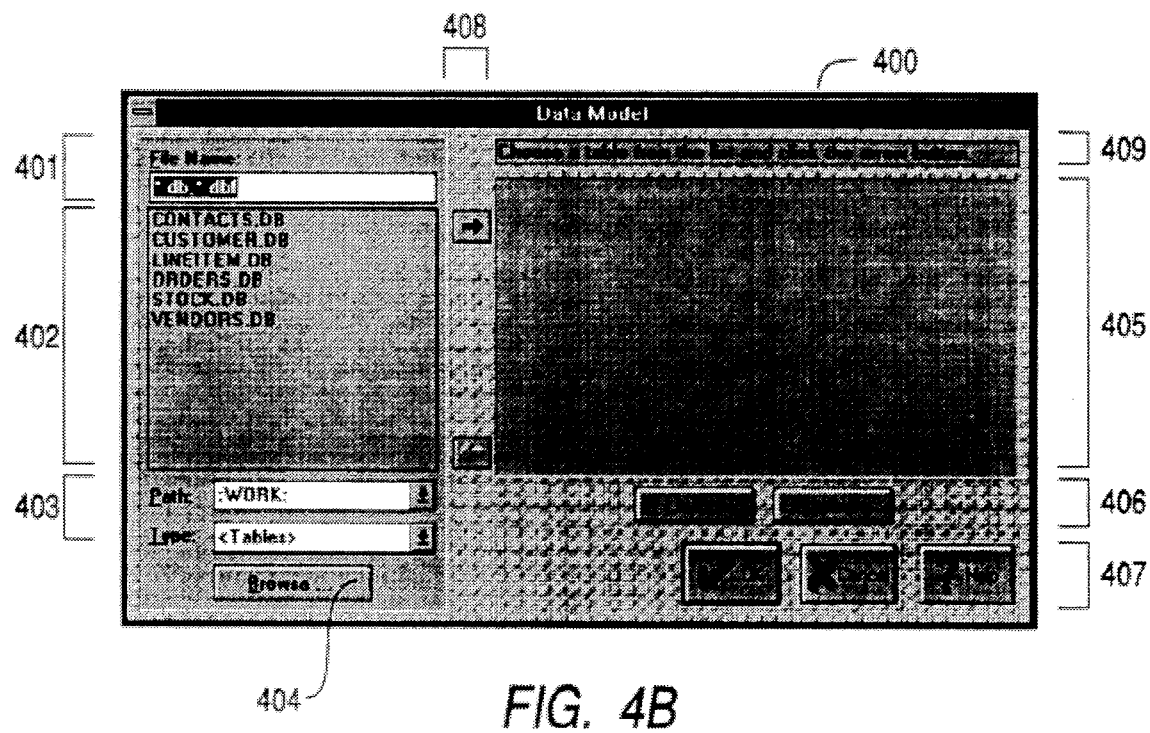

Shown in further detail in FIG. 4B, the data model dialog box 400 includes various tools to assist the user in achieving the desired model. In particular, the dialog 400 includes a table or file name field 401, a file list 402, access fields 403, a browse button 404, a modeling panel or region 405, link/unlink tools 406, and confirmation/cancel buttons 407. Additionally, the dialog may include add/delete arrow tools 408 and a hint or help window 409.

When a user selects a table from the file list 402 (or types it in edit field 401), the system displays an identifier for the table in the data model panel or image area 405. In effect, the user is telling the system that he or she wants to use information fields from that table in his or her design. Although in most instances a user will want to associate the document with one or more existing tables, the system allows one to create a blank document. In such a case, the system creates a design document that is not bound to any table's data. The use of the data model tools will now be described by illustrating the creation of various data models.

B. Creating a single-table data model

A single-table design uses the data from only one table and is, expectedly, an easy type of model to design. As described below, some of the tools available in the data model dialog 400 apply only when one creates multi-table designs; in the instance of working with only one table, these tools are preferably disabled.

Figure 4C:
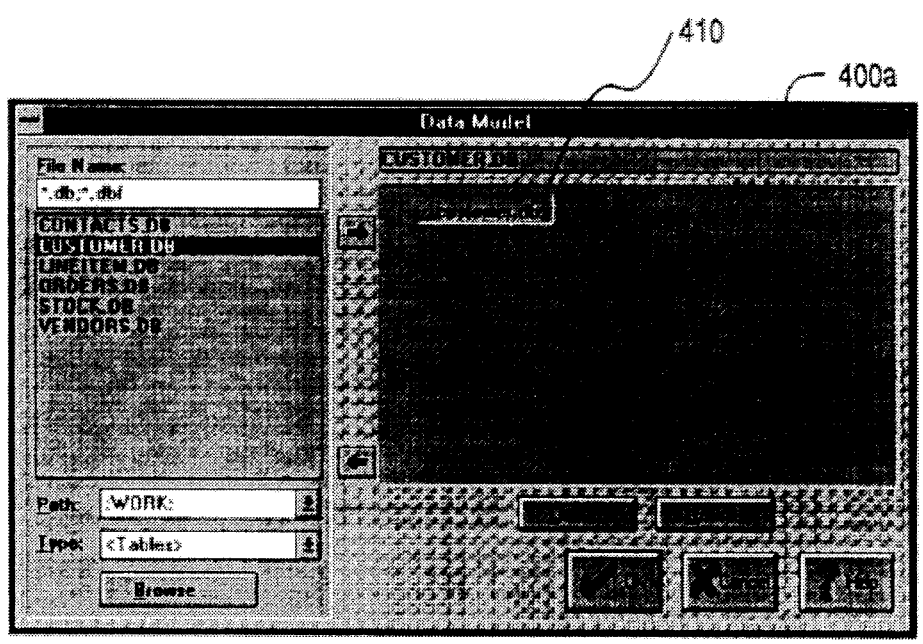

In a typical operation, a single-table data model is created by selecting the table desired from the file name list 402 (e.g., by clicking on the desired table with the pointing device 105). In response, the system displays the selected table's name in a recessed area of the data model panel 405. As shown in FIG. 4C, for instance, the user has selected the "customer" table; in response, the system displays an identifier 410 for the table in the data model panel 405. Tables may be added or removed from the panel using the arrow tools 408.

Figure 4D:
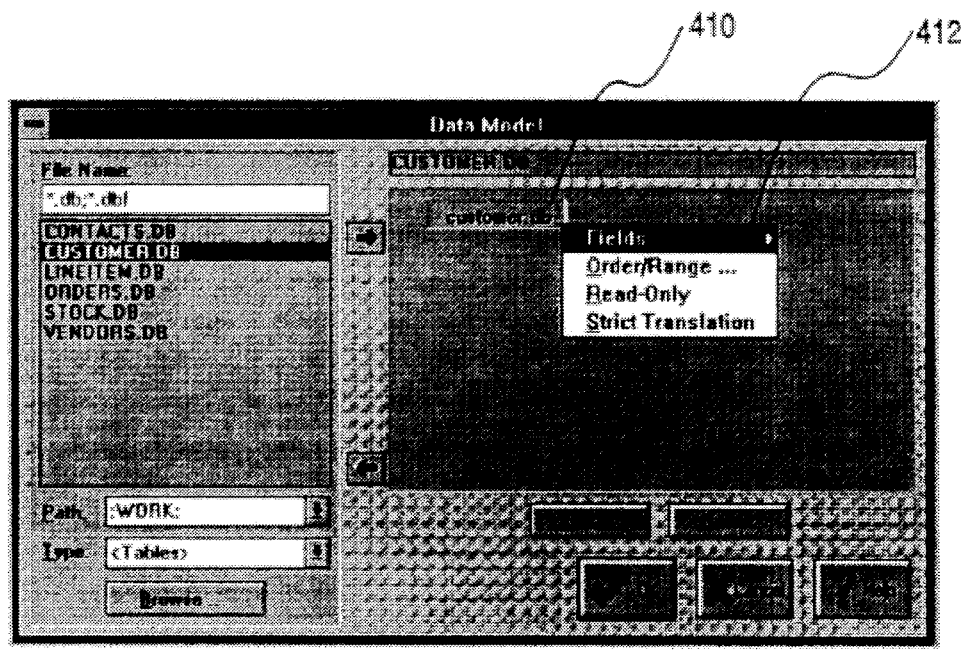
Figure 4E:
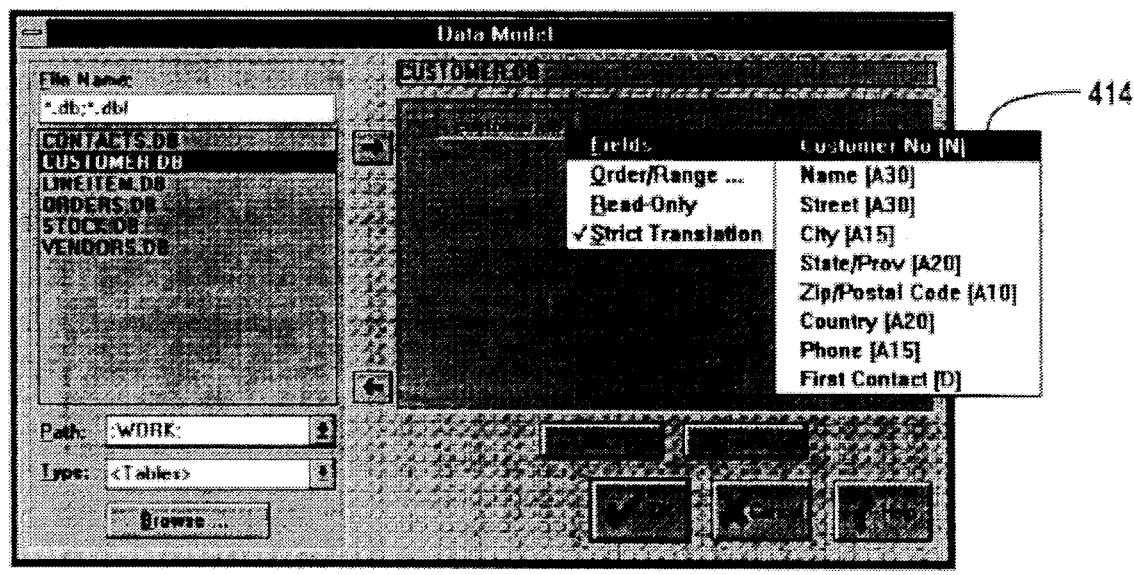

Once a user has placed a table in the data model panel, he or she can inspect it. For instance, in response to a request for inspection of the table identifier 410 (e.g., by a right mouse button click proximate the identifier), the system displays a local menu 412 as shown in FIG. 4D. The menu includes items specific for the object (table) being inspected. For instance, selecting the fields option from the menu 412 displays a list 414 of available fields for this specific table (i.e., the customer table) as shown in FIG. 4E. When the user is satisfied with the table selected, he or she instructs the system to close the dialog 400 (e.g., by selecting the "OK" button from buttons 407).

Figure 4F:
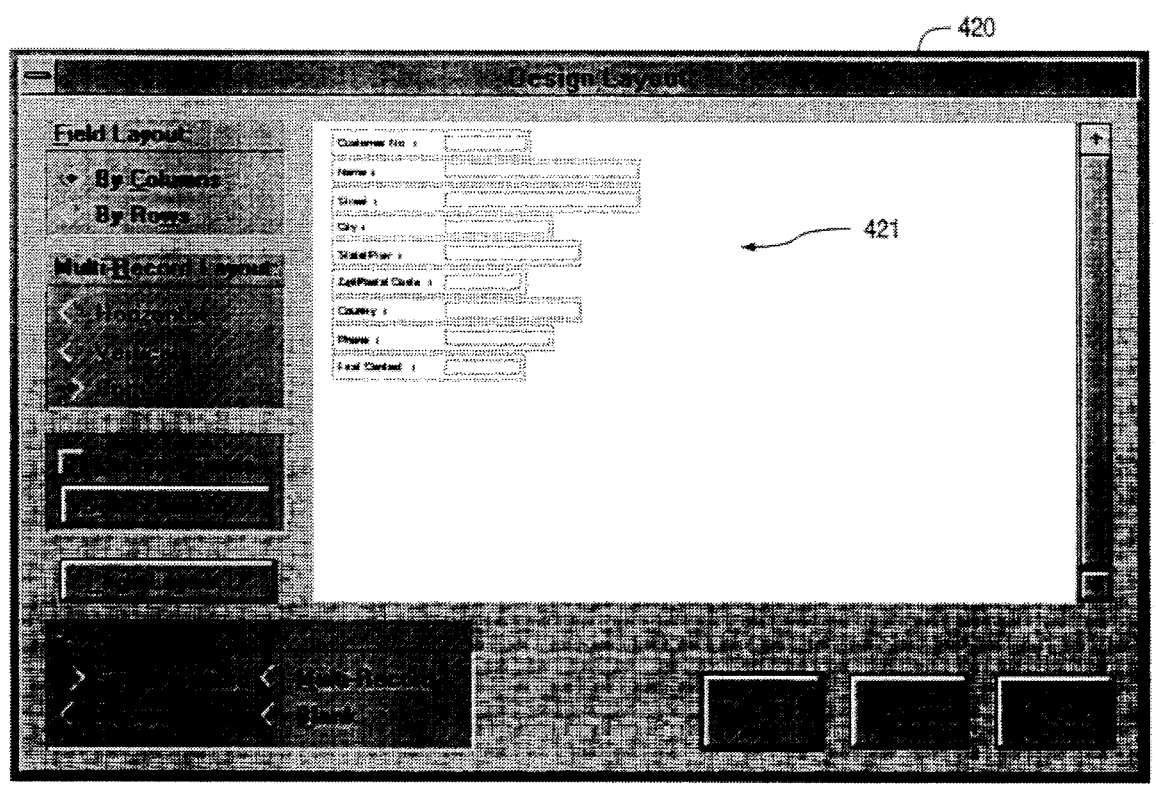

Upon closing the data model dialog box, the system displays a design layout dialog box 420 as shown in FIG. 4F. The system displays a preview image 421 of the data model's fields in a preview window. FIG. 4F shows the default layout for a single-table form (using the Customer table example). The design layout dialog includes a field layout panel for controlling how fields and single-record and multi-record styles are displayed. For multi-record layout, an additional panel is provided that controls how multi-record styles are displayed (e.g., horizontal, vertical, or both). Using the design layout dialog box 420, the user can preview various layout options, choosing a desired one for creating the design of interest.

C. Creating a multi-table data model

Using the data model dialog 400, the user can also create design documents that employ data from one or more tables, that is, multi-table designs. In general, the user proceeds to define a data model for a multi-table design by identifying the tables he or she desires to use. Next, the user indicates which tables are desired to be linked by clicking and dragging from one table to another. In response, the system automatically determines how the tables are to be linked.

Figure 5A:
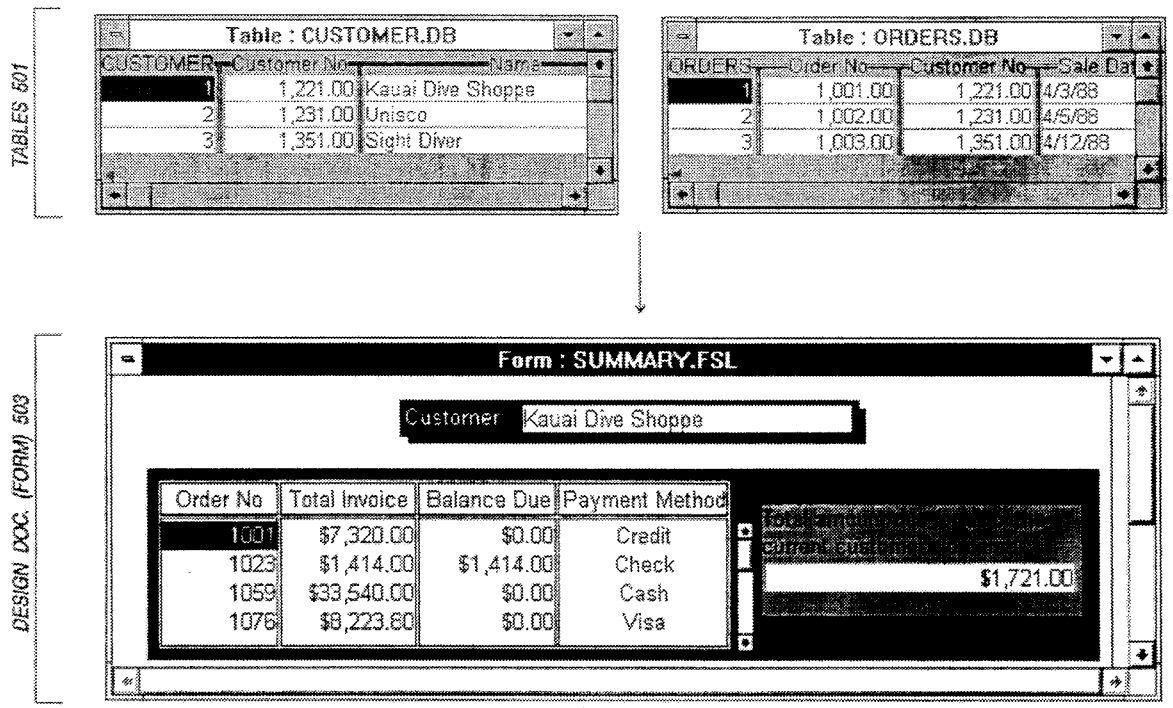
FIGS. 5A–F are bitmap screenshots illustrating the Data Model component being employed for modeling a multi-table relationship, between a master table and a detail table.
Figure 5B:
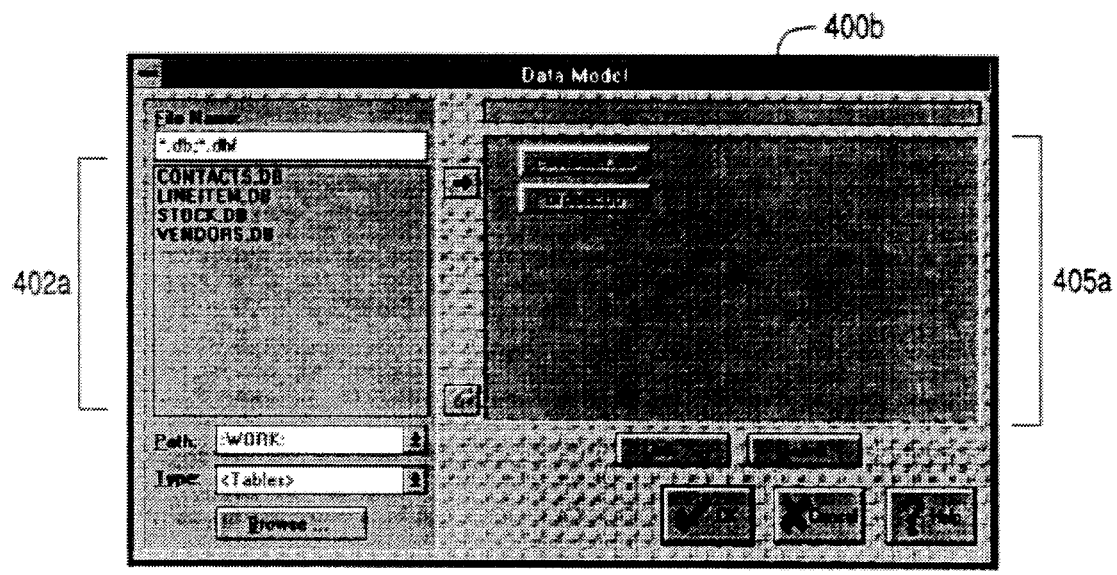

Suppose, for example, that the user desires to create a form summarizing orders from various customers. As shown in FIG. 5A, a form design document 503 may be created based on information stored in Customer and Orders tables 501. As shown in FIGS. 5B–E, the steps for creating the form are as follows. First, the user places all the tables he or she wants available for use in the document within the data model panel of the data model dialog box 400. The user may, for example, select a table from the file name list (e.g., by double-clicking it, or clicking it once and then selecting the add table arrow). As shown by the data model dialog 400b of FIG. 5B, the Customer and Orders tables are displayed in the panel 405a, after selection from the table list 402a. The user may repeat the process until all the tables he or she wants are placed in the data model panel. If a user plans to use many tables in his or her design, he or she might prefer to link (described below) tables as the tables are added (as opposed to adding them all and then linking). This allows the user to avoid scrolling the data model panel to view all the tables desired to be linked. The user can remove a table from the data model panel by selecting it and choosing the remove table arrow (from arrows 408). Once tables are linked, however, the user should preferably not be able to remove them from the data model panel unless the "unlink" option (from buttons 406) is selected to break the link.

Tables a user desires to be linked require a common field. The name for the field does not have to be the same in both tables, but the field type and size should match. Suppose, for example, a user is creating a data model that uses the Customer and Orders tables. As seen by visual inspection of the tables 501 (of FIG. 5A), the Orders table's Customer No field contains values that match corresponding ones in the Customer table. To avoid the storage of redundant information, it is easier and more efficient to keep order and customer information in separate tables; otherwise, the user needs to enter customer information (addresses, phone numbers, and the like) every time he or she enters an order.

Since the user desires to see data from both tables at once (as specified in the form 503), the two tables are to be linked. When a user links two tables, he or she is asking the system to evaluate a value in the master table (the table the user is linking from), and find all matching values in the detail table (the table the user is linking to). When one links customer and orders tables, the system looks at each value in the Customer No field of Customer and finds matching values in the Customer No field of Orders. By using an index, the system can rapidly find the matching values in orders. To achieve this, the detail table is indexed on the field used in the link (this being achieved either through a primary index (key) or secondary index on the link field).

There are many types of links which may be created between tables. In particular, one can create single-valued relationships or multi-valued relationships between tables. In the form 503, for instance, one can see that each record of the customer (master) table has none, one, or more corresponding records in the orders (detail) table.

A single-value relationship, also called one-to-one link or many-to-one link, exists between tables if for every record in one table, no records or only one record from another table is related to it. For example, the relationship between a line item ordered (each unique value in Line Item) is one item of Stock (a unique value in Stock). In such an instance, the relationship between Line Item and Stock is single-valued. In a many-to-one relationship, many records in the master table are related to one value in the detail table. The Line Item table, for example, lists specific items that a customer orders. Several items can be ordered at the same time, so many Line Item records can point to the same Orders value.

A multi-value relationship, also called a one-to-many link, exists between tables if for every record in one table, no records, one record, or more than one record from another table is related to it. For example, one customer (one record in the Customer table) may have placed no orders, one order, or many orders (records in the Orders table). This means that each record in the customer table can have many records in the orders table that match it. Thus, this is a one-to-many relationship.

Figure 5C:
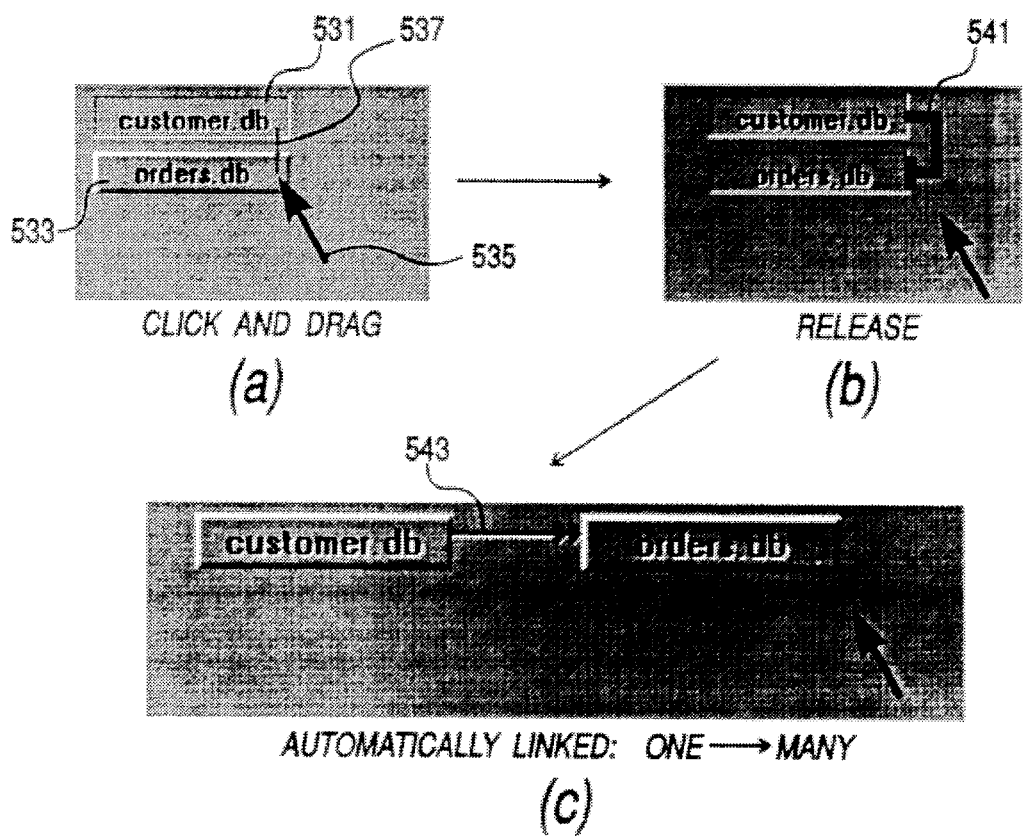

Once a user has placed the tables he or she wants linked in the data model panel, he or she proceeds to instruct the system to create the link between them. This process will now be described with reference to FIGS. 5C–D. As shown by FIG. 5C, to automatically link one table to another, the user need only select the two tables with the pointing device cursor. To link the Customer table 531 to the Orders table 533, the user clicks (depresses button) and drags (continually depresses button while moving) cursor 535 from the Customer table identifier to the Orders table identifier, as shown by frame (a) of FIG. 5C. As shown, a rubber-banding line 537 is drawn to indicate the potential link. Upon release of the button, the system immediately draws a link 541 while the system now automatically determines what link to effect between the two tables. Immediately, as shown by frame (c) of FIG. 5C, the system determines that a one-to-many link is to be established between the Customer and Orders tables; thus, a one-to-many arrow 543 is displayed connecting the two tables. Thus, when the user drags from the Customer table to the Orders table, the system automatically recognizes an existing referential integrity relationship desired between the two tables and links them accordingly (by their Customer No fields).

Figure 5D:
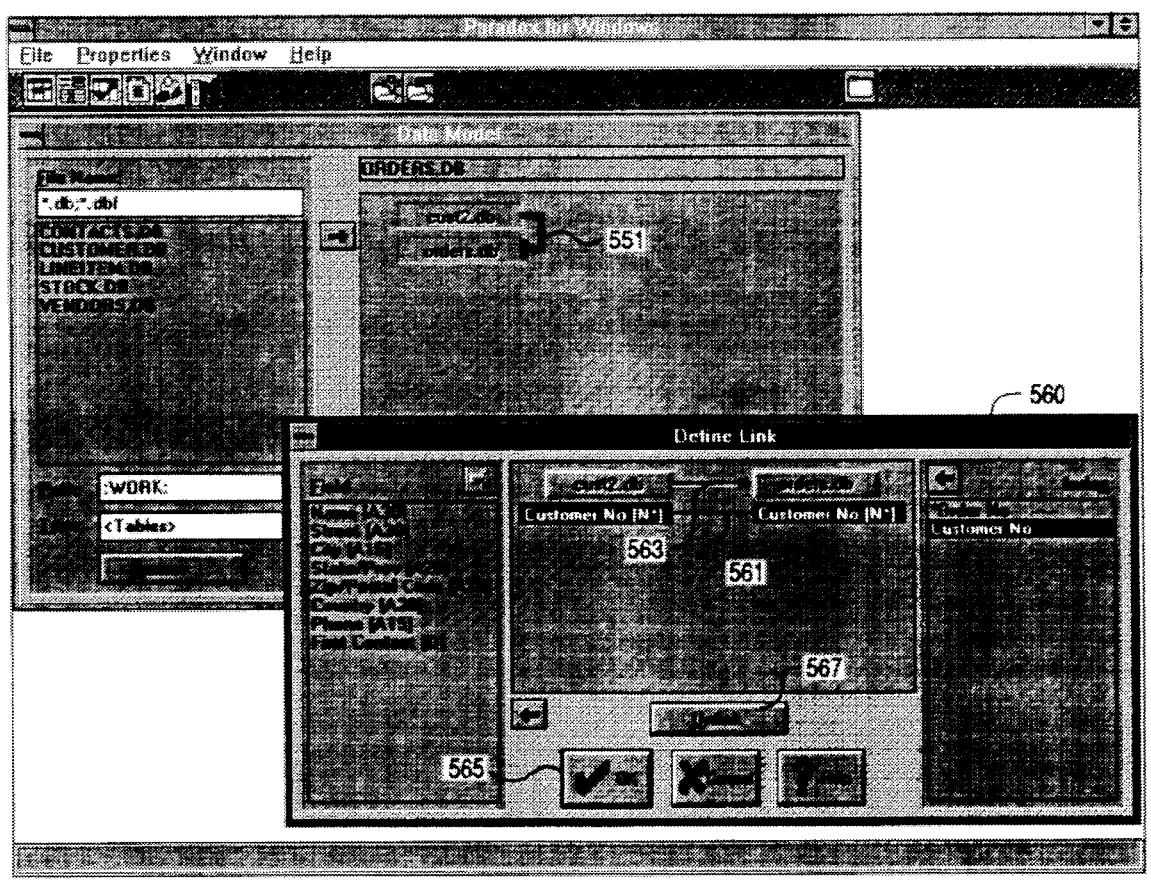

With particular reference to FIG. 5D, a method for linking system tables without referential integrity having been defined will now be described. Suppose, for example, that the user has another customer table, "Cust2" which the user desires linked to the Orders table. Suppose also that no referential integrity relationship exists—no foreign keys are available. The user proceeds in a manner similar to that just described. First, the Cust2 and Orders table are placed on the data model panel (after selection from the table list). Next, the user clicks on the Cust2 table and drags to the Orders table. Upon release of the pointing device button, the system draws the link 551 between the two tables. At this point, however, the system cannot exactly determine (from an existing referential integrity relation) the desired link; thus, the system opens a defined link dialog box 560.

Although the system has not been able to complete the link, it may proceed intelligently based on existing information known about the tables. Since the Cust2 table includes a primary key on Customer No, the system places Customer No below the Cust2 table in the link diagram panel of the dialog box. Since this is the Cust2 table's key, the system attempts to create a default link on the field. Also shown, the system places Customer No below the Orders table in the link diagram panel. If this detailed table has an index that matches the primary index (key) of the master table, the system uses it. The system draws a link line 561 between the field and the index and places one-to-many arrow 563 between the two table names. The user can choose the OK button 565 to accept the link, whereupon the system returns the user back to the data model dialog box (e.g., for adding or removing tables from the model). Thus, if there is an intelligent choice of fields to link (e.g., a match between the primary key field of a master table with an indexed field of a detail table), the system opens the define link dialog box 560 with the link already created. The user can accept, modify, or reject the choice. To unlink the automatic link and manually create a new one, the user selects the unlink button 567.

Figure 5E:
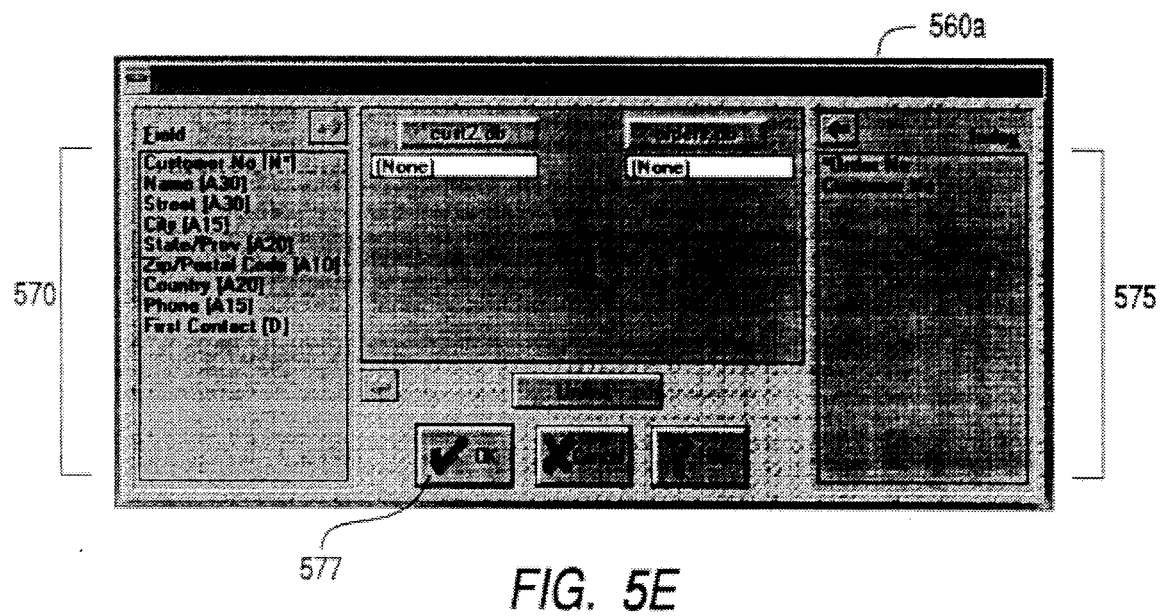

Using the define link dialog 560a of FIG. 5E, the tables are manually linked as follows. The system shows all fields from the master (Cust2) table in the field list 570. From the field list, the user can choose the link field for the master table. Upon selection, the field name appears below the table name in the link diagram panel of the dialog box. In response to this selection, the system automatically searches for an index or indexable field of the detail table that matches (through name and/or type) the field the user has chosen, to complete the link for the user. If no match can be found, the system automatically selects the first index of the detail table that matches in type. The user can choose another index to replace the automatic choice. As shown, the dialog includes an index list 575 showing all predefined, maintained indexes for the detail (Orders) table. The table's key (its primary index) is marked with an asterisk. All fields of a composite key are displayed linked with a dash and marked with an asterisk. For example, the composite key of Line Item is listed as *order#-stock#. The table's secondary indexes are listed after the key.

Upon selection of the index the user wants to use for the detail table, its name appears below the detail table name in the link diagram panel of the dialog box. If the user is using a composite key on the master table, he or she can choose an indexed field of the detail table to match each field in the composite key. In the instance where an existing index is not available for the field which is desired to be linked on, the system may automatically create one (i e., . "on the fly") for indexable fields. After manually defining a link (with automatic assistance by the system), the user may close the define link dialog (e.g., by selecting the OK button 579).

Figure 5F:
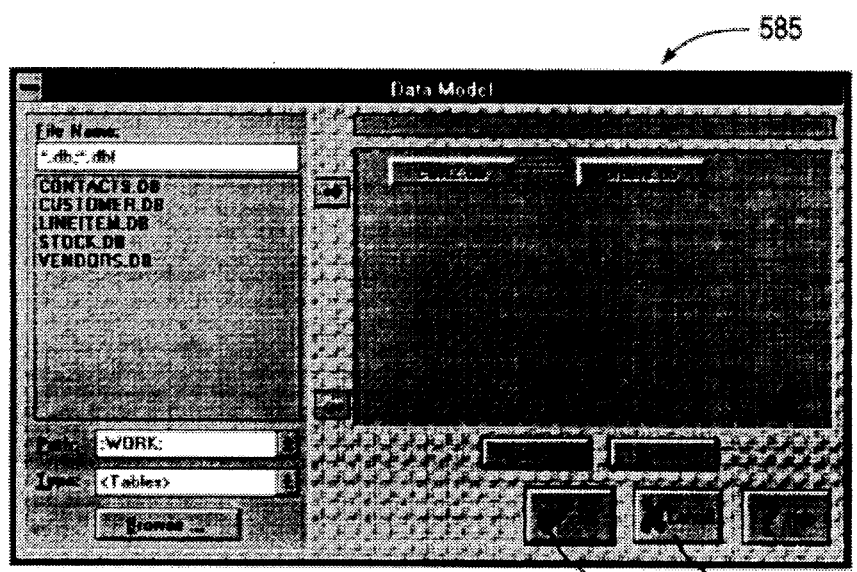

After the user has chosen a matching field from the master table and an index (or indexable field) from the detail table, the system creates a link between the two. The user may preview the link in the diagram panel of the data model dialog 585 as shown in FIG. 5F. If the user desires a different link, he or she can select the unlink button and choose a different field or index. When satisfied with the link, the user may accept (e.g., by selecting the OK button 581) or reject (e.g., by selecting the Cancel button 583) the data model. Upon acceptance of a data model, the system proceeds to display a design layout (such as that described for FIG. 4F).

Throughout the foregoing process, user feedback is provided. In a preferred embodiment, the data model dialog shows what type of link exists between tables. For a multi-value relationship, the two tables are displayed side by side, with a double-headed arrow between them, the direction of the arrows showing the direction of the link (e.g., master→detail). For a single-value relationship, one table is displayed stacked below another, with an arrow joining the two from their sides. Use of link feedback is particularly advantageous during construction of complex data models, which will now be described.

Building complex data models

As shown by FIGS. 6A–E, the user can keep linking tables to the existing data model until he or she has achieved the data model desired. In this manner, the user can build data models that are as complex as needed.

Figure 6A:
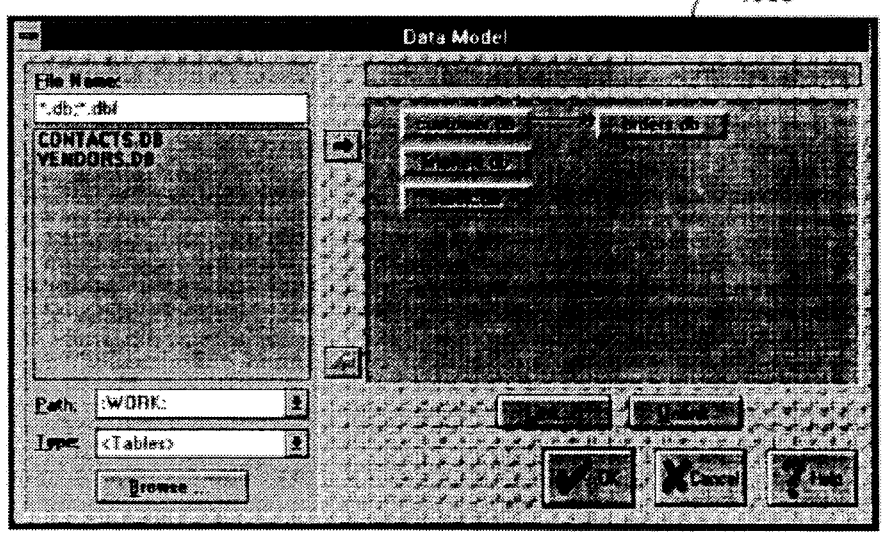
Figure 6B:
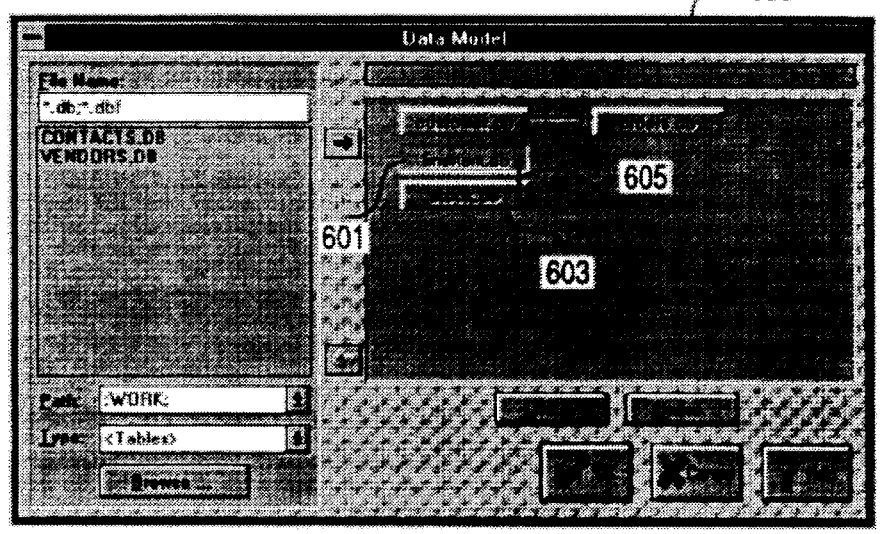
Figure 6C:
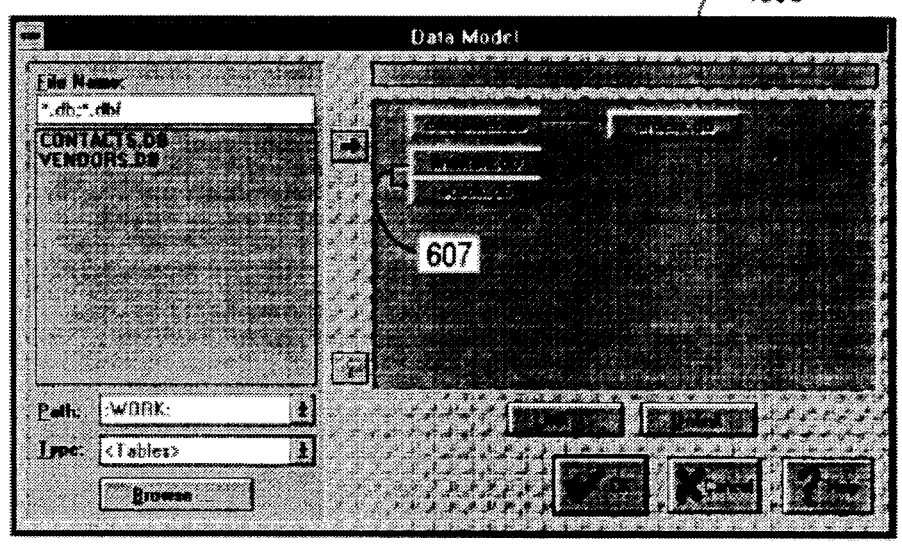
Figure 6D:
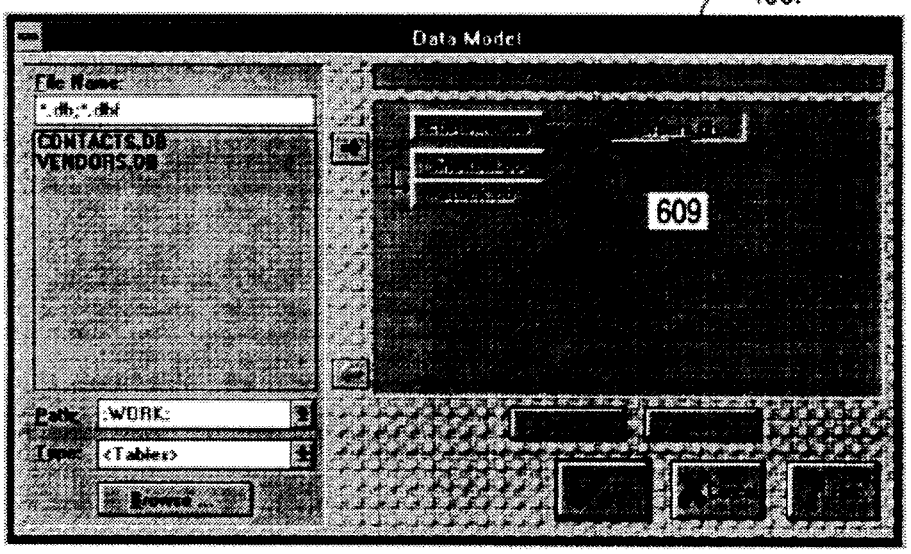

As shown in FIG. 6A, the user has added the Line Item and Stock tables to the model panel of data model dialog 400c. These tables are linked to the model as follows. Using the pointing device, the user clicks and drags from the Line Item table 601 to the Stock table 603; during the process, a rubber-banding line 605 is displayed for indicating the potential link as shown in dialog 400d of FIG. 6B. Upon releasing the button of the pointing device, the system automatically determines a one-to-one relation between the Line Item table and the Stock table. Accordingly, a single-headed arrow 607 is displayed between the two tables, as shown in the data model dialog 400e of FIG. 6C.

Next, the user proceeds to instruct the system to link the Orders table to the Line Item table. As before, the user clicks on the master (Orders) table and drags towards the detail (Line Item) table. As shown by the dialog 400f of FIG. 6D, the system displays the rubber-banding link line 609 for indicating this potential relationship. Upon release of the pointing device button, the system automatically links the Orders table to the Line Item table, as shown by the data model 620 of FIG. 6E. Between the Customer and Orders tables, a multi-value (one-to-many) relationship 621 exists. Between the Orders and Line Item tables, another multi-value (one-to-many) relationship 623 exists. Finally, between the Line Item and Stock tables, a single-value (one-to-one) relationship 625 exists. Thus, with just three click-and-drag operations, the user may create the links necessary for the complex data model 620.

Internal Operation

Referring now to FIGS. 7–8, a preferred method of the present invention for intelligently determining links will now be described. FIGS. 7A–B illustrates an overview of the method. The detailed steps are represented in flowchart format in FIG. 8.

When determining a link, the system favors creating a link via a unique key of one of the tables (typically the master table). A unique key may be a primary key, another candidate key, or other means which uniquely identifies a record (e.g., unique index). As the primary key is typically the key of most interest of the available candidate keys, it receives highest preference. In the event that a link is not available via the primary key, however, the system may proceed to investigate other candidate keys or other unique indexes of the table (giving these preference over non-unique indexes) for linking.

For clarification, the following description will focus on use of a primary key as the unique key. The reader should bear in mind, however, the aforementioned distinction between primary, candidate, and other unique keys. Exhaustion of possible links for one type of unique key (e.g., primary key) will preferably be followed by a similar inquiry for the other keys (e.g., next candidate key) according to the preferences of the implementor.

For the table pair 701 of FIG. 7A, the Cust table includes a primary key on the Cust No. field. Since a primary key is a unique identifier and usually the most preferred of available unique identifiers (e.g., other candidate keys), it is normally very good for linking one table to another. As shown for the primary key of the Cust table, the table to be linked (i.e., Orders table) includes an indexable field matching the primary key of the master table; thus, a foreign key is available through the indexable field. As shown by table pair 703, it is possible that a foreign key relationship may actually occur in both direction. Table pair 703 illustrates the many-to-one relation which complements the one-to-many relation of table pair 701. Thus, as the first step, the system searches for an existing foreign key relationship.

In a preferred embodiment, a foreign key relationship need not be explicitly defined (e.g., through referential integrity). As shown by FIG. 7B, the system may imply a foreign key relationship when no existing one is found. Specifically, if a primary key of the master is found yet there is no existing foreign key relationship between the master and the detail tables, the system searches for an indexable field of the detail table which supports the master's primary key.

The general process is as follows. The system looks for an index (indexable field) of the detail which supports the key. To match, the field of the index must have the same (or compatible) data type as that of the primary key. As shown by the table pair 707, for instance, the Cust No. field of both tables has a data type of A40 (i.e., alphanumeric and up to 40 characters). In this manner, the system may determine fields between tables which support a link, including fields which share a common domain, that is, a common pool of values for one or more that have the same meaning. Thus, if no foreign key relationship were declared between the two tables, the system may still effect a link through corresponding Cust No. fields of the tables.

Although matches must be data type compatible, they need not have identical names for the respective fields. Suppose, for example, that the Orders table stored the customer number in a "Customer No." field. In such an instance, the system may still deduce the match between Cust No. of the Cust table and Customer No. of the Orders table. Thus, the system prefers a match by name and type. In the instance where a name match is not possible, the system retains the last type match.

The system prefers an entire match on the key, as opposed to a partial match. If the primary key is itself composite, then the system should preferably not prefer a non-composite index. Instead, it prefers a composite index which has just exactly the same types of fields as the primary key, in the same order. Failing that, however, the system will prefer an index in which the leading fields match, with the fewest extra fields.

Figure 8A:
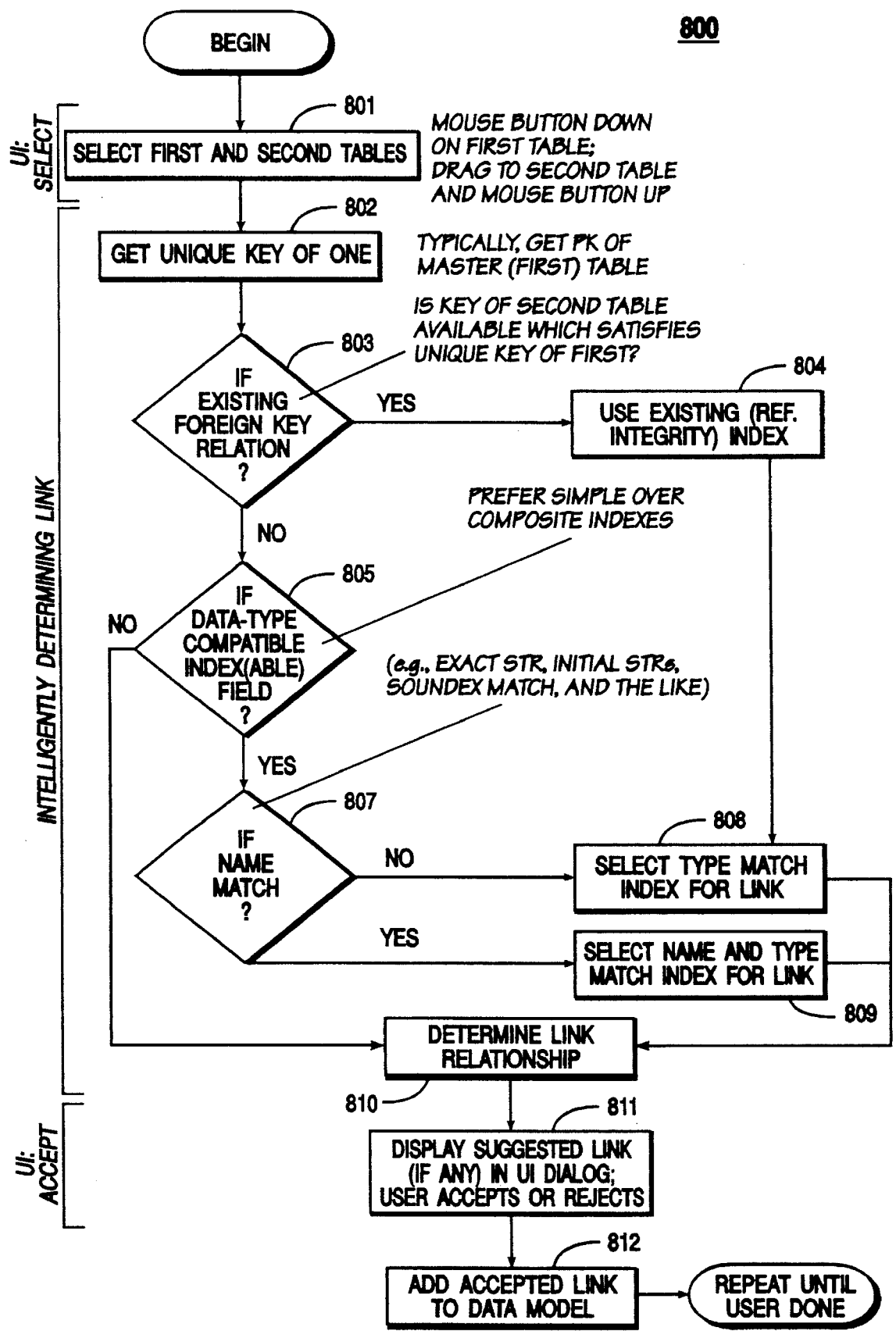
FIGS. 8A–B are flowcharts illustrating a method of the present invention for automatically linking tables.
Figure 8B:
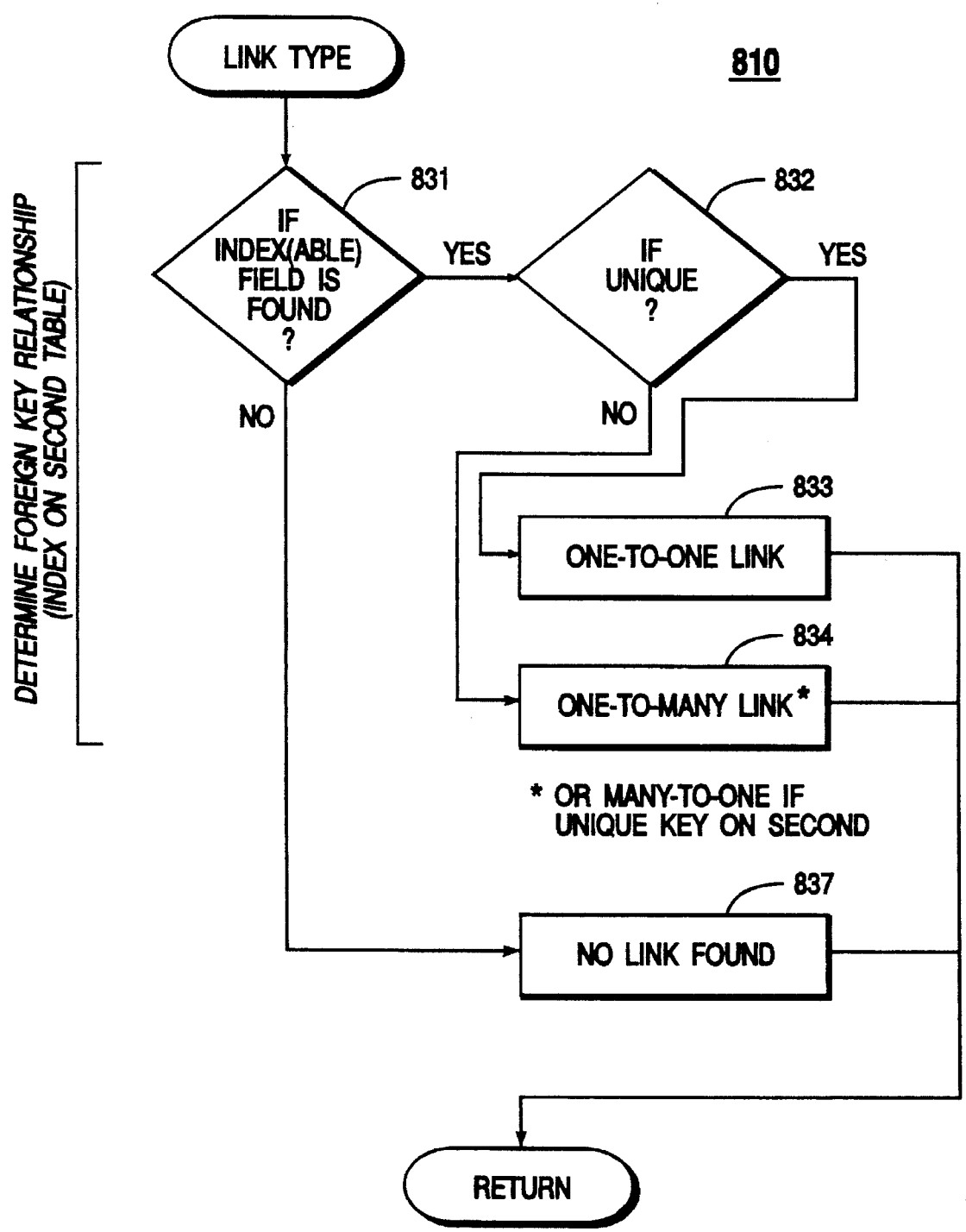

Referring now to FIGS. 8A–B, a preferred method of the present invention for intelligently determining links will be illustrated by a flowchart 800. The steps are as follows. In steps 801, the user selects first and second tables. Typically, the first table will serve as the parent or master table, and the second table will serve as the child or detail table. In a preferred embodiment, the two tables are selected in a single operation by drawing a line from one table to another with a pointing device (e.g., dragging from a master to a detail using the previously described user interface techniques). After the two tables have been selected, the method proceeds to intelligently determine what link is desired between the two tables.

At step 802, the method determines a unique key for one of the tables. The unique key is preferably the primary key of the first selected table. In the event that a primary key is not available, the system may proceed to other unique keys, such as other candidate keys and other unique indexes. At step 803, the method determines if a foreign key relationship exists between the two tables: finding a key of the second table which satisfies a unique key of the first table. If such a relationship already exists (yes at step 803), then an existing (referential integrity) link may be employed, as shown at step 804. If a foreign key relationship does not already exist (no at step 803), then the method may possibly imply such a relationship. At step 805, the method determines if a data-type compatible index (or indexable field) exists for the detail table. If such an index is found (yes at step 805), or can be built on the fly (e.g., by indexing on a candidate key which is declared but not yet indexed), then the method proceeds to step 807 to further refine the candidate link by attempting a name match. Thus, the method prefers a match not only as to data type, but also as to name. As is known in the art, there exists many acceptable techniques for comparing name (text) strings, including exact match, substring match, Soundex match, and the like. Upon finding such a match (yes at step 807), the method proceeds to step 809 to select the matched index for use in the link. If a name match is not found (no at step 807), however, the method proceeds to step 808 to employ the data-type compatible index for the link.

Next, at step 810, the method determines a link relationship to suggest to the user. As shown in further detail in FIG. 8B, the method may deduce the type of link relationship as follows. At step 831, if no index (or indexable field) has been found (no at step 831), then the method will not suggest a link between the two tables (i.e., no link), as shown in step 837. If, on the other hand, an index (or indexable field) has been found (yes at step 831), then the method proceeds to step 832 to determine the uniqueness of the index which satisfies the parent's key. If the index is unique (yes at step 832), then a one-to-one link may be deduced, as shown at step 833. If the index is non-unique (no at step 832), however, then a one-to-many link may be deduced, as shown at step 834. The converse (many-to-one) relationship may also be deduced in the instance where the unique key (e.g., primary key) to be satisfied is from the second table. After deducing a link type, the method returns back to the method 800.

Continuing to step 811 of method 800, the suggested link (if any) is displayed to the user (e.g., using data model dialog 400). At this point, the user may accept or reject the suggested link. In the case of the latter (or at any time during the process), the user may manually create a desired link (as discussed above); the process may be automated to an extent by automatically locating/creating foreign keys (using the above steps) which satisfy the field(s) which the user has manually selected. Finally, the accepted link (if any) is added to the data model at step 812; the reason for the link (e.g., one-to-many) is displayed as user feedback. The method 800 may be repeated as desired for adding additional tables (and relationships) to the data model.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In an information processing system, a method for automatically linking information tables, each table including at least one information field, the method comprising:

(a) receiving user input for selecting first and second information tables to link;

(b) determining a unique key for one of the two tables;

(c) automatically determining by said system a foreign key for the other of the two tables which satisfies said unique key; and (d) if a foreign key is available, automatically linking said first and second tables through the foreign key.

2. The method of claim 1, further comprising:

(e) if said unique key is from the first table and said foreign key is from the second table and is also a unique key, indicating to a user a one-to-one link.

3. The method of claim 2, wherein step (e) includes:

displaying on a screen device an indicator for each of said first and second tables; and indicating a one-to-one link with a single arrow-head line drawn from one identifier to the other.

4. The method of claim 1, further comprising:

(e) if said unique key is from the first table and said foreign key is from the second table and is not a unique key, indicating to a user a one-to-many link.

5. The method of claim 4, wherein step (e) includes:

displaying on a screen device an identifier for each of said first and second tables; and indicating a one-to-many link as a double arrow-head line drawn from one identifier to the other.

6. The method of claim 1, further comprising:

(e) if said unique key is from the second table and said foreign key is from the first table and is not a unique key, indicating to, a user a many-to-one link.

7. The method of claim 6, wherein step (e) includes:

displaying on a screen device an identifier for each of said first and second tables; and indicating a many-to-one as a single arrow-head line drawn from the identifier for the first table to the identifier for the second table.

8. The method of claim 1, further comprising:

(e) if a foreign key is not available, determining at least one field of the other table which shares a common domain with at least one field of the unique key.

9. The method of claim 1, further comprising:

(e) if a foreign key is not available, determining at least one indexable field of the other table which may serve as the foreign key.

10. The method of claim 9, wherein step (e) includes:

locating at least one indexable field of the second table having a data type compatible with said unique key.

11. The method of claim 10, wherein step (e) further includes:

if more than one said at least one indexable field having a compatible data type are available, selecting one having at least one field name which corresponds to at least one field name of the unique key.

12. The method of claim 11, wherein said selecting at least one indexable field having at least one field name which corresponds includes:

matching a text substring of said at least one indexable field with a text substring of at least one field name of the unique key.

13. The method of claim 9, wherein after step (b) further comprises:

if a unique key cannot be automatically determined, selecting with an input device at least one field from one of said tables; and and locating at least one field of the other table which shares a common domain with said selected at least one field.

14. The method of claim 1, wherein said unique key includes a key selected from at least one candidate key.

15. The method of claim 1, wherein said unique key includes a primary key.

16. The method of claim 1, wherein said unique key includes an index which uniquely identifies each record of its table.

17. The method of claim 1, wherein step (a) includes determining a unique key by first attempting to locate a primary key, if no primary key is located, then attempting to locate other candidate keys, if no other candidate keys are located, then attempting to locate other unique indexes.

18. The method of claim 1, wherein step (a) includes:

displaying a list of available tables on a screen device;

selecting from the list at least two tables; and drawing on the screen device a line from one selected table to another.

19. The method of claim 18, wherein a table that the line is drawn from becomes said first table and a table that the line is drawn to becomes said second table.

20. The method of claim 1, further comprising:

repeating steps (a)-(d) with a new table as one of said first and second information tables, and an existing table as the other of said first and second information tables.

21. A system for modeling data in a relational database management system comprising:

a computer having a processor, a memory, and a screen device;

interface means for receiving user input for requesting a link from a first information table to a second information table; and means, responsive to said request means, for automatically determining by said system a relationship which links said first and second information tables.

22. The system of claim 21, wherein said interface means includes:

means for selecting a plurality of tables from a list of available information tables;

means for displaying on the screen device an identifier for each selected tables; and means for selecting first and second identifiers for requesting a link from corresponding first and second information tables.

23. The system of claim 22, wherein said means for selecting includes input means for drawing a line from one identifier to another, wherein an identifier that the line is drawn from becomes said first identifier and an identifier that the line is drawn to becomes said second identifier.

24. The system of claim 21, wherein said determining means includes:

means for determining a unique key of one of said first and second information tables and determining a foreign key of the other which satisfies said unique key.

25. The system of claim 24, further comprising:

means for indicating a one-to-one relationship between said first and second tables if the foreign key which satisfies the determined unique key is also a unique key.

26. The method of claim 24, further comprising:

means for indicating a one-to-many relationship between said first and second tables if the foreign key which satisfies the unique key is not a unique key.

27. The system of claim 21, wherein said determining means includes:

means for determining a unique key from one of said first and second tables; and means for determining a foreign key for the other of said first and second tables which satisfies said unique key, said means including means for creating a foreign key relationship if none exists.

28. The system of claim 27, wherein said means for creating a foreign key relationship includes:

means for determining an indexable field of the other of said first and second tables which has a data type compatible with said unique key.

29. A system for linking information stored in data objects, each object including at least one field for storing data, the system comprising:

a storage device for storing a plurality of data objects;

a screen device for representing selected ones of the data objects;

input means for receiving user input for selecting first and second data objects to link;

means for determining a unique key for one of said first and second data objects; and means, responsive to said input means, for automatically linking by said system said first and second data objects through a foreign key which satisfies said unique key.

30. The system of claim 29, wherein said data objects include database tables.

31. The system of claim 29, wherein said input means includes a pointing device for positioning a cursor on the screen device and for generating user signals at a desired location on the screen device.

32. The system of claim 29, wherein means for determining a unique key includes:

means for determining at least one candidate key available for a data object; and means for selecting a primary key from said at least one candidate key.

33. The system of claim 29, wherein means for linking includes:

means for determining at least one indexable field of the other table which satisfies the unique key.

34. The system of claim 29, wherein means for linking includes:

means for determining a link type between said first and second data objects; and user feedback means, operably coupled to the screen device, for indicating the link type to a user.

35. The system of claim 34, wherein said link type is a selected one of one-to-one, one-to-many, and many-to-one.

* * * * *